US012338413B2

(12) United States Patent
Man et al.

(10) Patent No.: US 12,338,413 B2
(45) Date of Patent: Jun. 24, 2025

(54) METHODS OF CLEANING AND SOIL RELEASE OF HIGHLY OIL ABSORBING SUBSTRATES EMPLOYING OPTIMIZED EXTENDED CHAIN NONIONIC SURFACTANTS

(71) Applicant: ECOLAB USA INC., Saint Paul, MN (US)

(72) Inventors: Victor Fuk-Pong Man, Saint Paul, MN (US); Derrick Anderson, Saint Paul, MN (US); Gang Pu, Saint Paul, MN (US); Jimmy Stokes, Duncan, SC (US); Kaustav Ghosh, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

(21) Appl. No.: 18/528,112

(22) Filed: Dec. 4, 2023

(65) Prior Publication Data

US 2024/0101927 A1 Mar. 28, 2024

Related U.S. Application Data

(63) Continuation of application No. 16/947,732, filed on Aug. 13, 2020, now Pat. No. 11,873,465.

(Continued)

(51) Int. Cl.

| | |
|---|---|
| ***C11D 1/72*** | (2006.01) |
| ***C11D 1/83*** | (2006.01) |

(Continued)

(52) U.S. Cl.

CPC .................. *C11D 1/72* (2013.01); *C11D 1/83* (2013.01); *C11D 3/0036* (2013.01); *C11D 3/0047* (2013.01); *C11D 17/0021* (2013.01)

(58) Field of Classification Search

CPC ........... C11D 1/72; C11D 1/83; C11D 3/0036; C11D 3/0047; C11D 17/0021; C11D 3/0038

See application file for complete search history.

(56) References Cited

U.S. PATENT DOCUMENTS

| | | |
|---|---|---|
| 3,871,898 A | 3/1975 | Reinert et al. |
| 4,492,646 A | 1/1985 | Welch |

(Continued)

FOREIGN PATENT DOCUMENTS

| | | |
|---|---|---|
| EP | 368146 A2 | 5/1990 |
| EP | 573341 B1 | 7/1998 |

(Continued)

OTHER PUBLICATIONS

Barber, J.A.S., et al., "Fluorescent tracer technique for measuring the quantity of pesticide deposited to soil following spray applications", Crop Protection 22 (2003) pp. 15-21. Mar. 18, 2002.

(Continued)

*Primary Examiner* — Peter F Godenschwager
*Assistant Examiner* — M. Reza Asdjodi
(74) *Attorney, Agent, or Firm* — McKee, Voorhees & Sease, PLC

(57) ABSTRACT

Disclosed herein are detergent compositions containing extended chain surfactants that form microemulsions with and can remove greasy and oily stains. In certain embodiments the extended nonionic surfactant includes Guerbet $C_{10}$ or $C_{12}(PO)_8(EO)_n$. The detergent compositions and methods of employing the same beneficially clean soils from textiles including difficult to remove cosmetic soils and food oils, even those comprised of non-trans fats.

8 Claims, 9 Drawing Sheets

Related U.S. Application Data

(60) Provisional application No. 62/886,483, filed on Aug. 14, 2019.

(51) Int. Cl.
*C11D 3/00* (2006.01)
*C11D 17/00* (2006.01)

(56) References Cited

U.S. PATENT DOCUMENTS

| | | | | |
|---|---|---|---|---|
| 5,082,584 | A | 1/1992 | Loth et al. | |
| 5,376,310 | A | 12/1994 | Cripe et al. | |
| 5,393,468 | A | 2/1995 | Erilli et al. | |
| 5,597,507 | A | 1/1997 | Garrett et al. | |
| 5,661,121 | A | 8/1997 | Dahlgren et al. | |
| 5,688,930 | A | 11/1997 | Bertho et al. | |
| 5,707,948 | A | 1/1998 | Evers et al. | |
| 5,780,416 | A | 7/1998 | Kiewert et al. | |
| 5,888,957 | A | 3/1999 | Durbut et al. | |
| 5,994,283 | A | 11/1999 | Durbut et al. | |
| 6,136,769 | A | 10/2000 | Asano et al. | |
| 6,156,712 | A | 12/2000 | Stringer et al. | |
| 6,228,829 | B1 | 5/2001 | Vinson et al. | |
| 6,254,859 | B1 | 7/2001 | Shapiro et al. | |
| 6,274,874 | B1 | 8/2001 | Sidhu | |
| 6,277,808 | B1 | 8/2001 | Tcheou et al. | |
| 6,472,364 | B1 | 10/2002 | Heltovics | |
| 6,498,134 | B1 * | 12/2002 | Scheibel | C11D 1/22 510/357 |
| 6,511,954 | B1 | 1/2003 | Wilbur et al. | |
| 6,589,926 | B1 | 7/2003 | Vinson et al. | |
| 6,613,726 | B1 | 9/2003 | Gagliardi et al. | |
| 6,740,627 | B1 | 5/2004 | Clarke et al. | |
| 6,774,099 | B1 * | 8/2004 | Scheibel | C11D 3/30 510/357 |
| 6,827,795 | B1 | 12/2004 | Kasturi et al. | |
| 6,903,064 | B1 | 6/2005 | Kasturi et al. | |
| 7,037,884 | B2 | 5/2006 | Man | |
| 7,288,512 | B2 | 10/2007 | Boone et al. | |
| 7,371,716 | B2 | 5/2008 | Ruland et al. | |
| 7,419,552 | B2 | 9/2008 | Ruland et al. | |
| 7,467,633 | B2 | 12/2008 | Smith et al. | |
| 8,235,120 | B2 | 8/2012 | Quintero et al. | |
| 8,314,057 | B2 * | 11/2012 | Christensen | C11D 3/43 510/342 |
| 8,580,727 | B2 | 11/2013 | Man et al. | |
| 8,785,363 | B2 | 7/2014 | Man et al. | |
| 9,303,240 | B2 | 4/2016 | Man et al. | |
| 10,421,926 | B2 | 9/2019 | Man et al. | |
| 2001/0026942 | A1 | 10/2001 | Carpenter et al. | |
| 2002/0193268 | A1 | 12/2002 | Embleton et al. | |
| 2003/0087787 | A1 | 5/2003 | Man et al. | |
| 2003/0100464 | A1 * | 5/2003 | Kott | C11D 3/046 510/357 |
| 2003/0114341 | A1 | 6/2003 | Liu | |
| 2003/0139313 | A1 | 7/2003 | Turner et al. | |
| 2005/0020466 | A1 | 1/2005 | Man et al. | |
| 2005/0049168 | A1 | 3/2005 | Yan et al. | |
| 2006/0211593 | A1 | 9/2006 | Smith et al. | |
| 2007/0054827 | A1 | 3/2007 | Cheung | |
| 2007/0143032 | A1 | 6/2007 | Wieringa et al. | |
| 2008/0207981 | A1 | 8/2008 | Hoag et al. | |
| 2009/0183877 | A1 | 7/2009 | Quintero et al. | |
| 2009/0208051 | A1 | 8/2009 | Erno et al. | |
| 2009/0223635 | A1 | 9/2009 | Lawless | |
| 2009/0261270 | A1 | 10/2009 | Carling | |
| 2009/0305940 | A1 | 12/2009 | Schimmel et al. | |
| 2010/0234263 | A1 | 9/2010 | Wasan et al. | |
| 2011/0112007 | A1 | 5/2011 | Hodge et al. | |
| 2012/0066839 | A1 * | 3/2012 | Man | C11D 1/37 510/276 |
| 2012/0066840 | A1 * | 3/2012 | Man | C11D 1/83 510/276 |
| 2012/0070388 | A1 * | 3/2012 | Man | D06L 1/12 508/501 |
| 2012/0071384 | A1 * | 3/2012 | Christensen | C11D 3/43 510/335 |
| 2013/0345111 | A1 | 12/2013 | Kieffer et al. | |
| 2014/0041131 | A1 * | 2/2014 | Man | C11D 1/83 510/276 |
| 2014/0174478 | A1 | 6/2014 | Letzelter et al. | |
| 2014/0196220 | A1 * | 7/2014 | Man | A61K 8/068 510/276 |
| 2016/0090551 | A1 | 3/2016 | Fossum et al. | |
| 2018/0037855 | A1 * | 2/2018 | Somerville Roberts | C11D 3/30 |
| 2018/0208876 | A1 * | 7/2018 | Man | C11D 1/66 |
| 2019/0330563 | A1 * | 10/2019 | Man | C11D 1/66 |
| 2021/0047588 | A1 * | 2/2021 | Man | C11D 1/72 |
| 2024/0101927 | A1 * | 3/2024 | Man | C11D 1/83 |

FOREIGN PATENT DOCUMENTS

| | | | |
|---|---|---|---|
| JP | 63073140 | A | 4/1988 |
| JP | 1100442 | A | 4/1989 |
| JP | 10292199 | A | 11/1998 |
| JP | 2001246339 | A | 9/2001 |
| JP | 2009210514 | A | 9/2009 |
| WO | 199732962 | A1 | 9/1997 |
| WO | 199927054 | A1 | 6/1999 |
| WO | 200068348 | A1 | 11/2000 |
| WO | 2007064525 | A1 | 6/2007 |
| WO | 2007101470 | A1 | 9/2007 |
| WO | 2010086821 | A2 | 8/2010 |
| WO | 2010105816 | A1 | 9/2010 |
| WO | 2012036701 | A1 | 3/2012 |
| WO | 2018136719 | A1 | 7/2018 |

OTHER PUBLICATIONS

Bergervoet, P.W.M. et al., "Application of the forensic Luminol for blood in infection control", Journal of Hospital Infection, 68, pp. 329-333, Jan. 18, 2008.

Carling, Philip, et al., "Improved Cleaning of Patient Rooms Using a New Targeting Method", Brief Report, Dept. of Hospital Epidemiology, et al., pp. 385-38, Dec. 29, 2005.

Charoensaeng, Ampira et al., "Solubilization and Adsolubilization of Polar and Nonpolar Organic Solutes by Linker Molecules and Extended Surfactants", J Surfact. Deterg., 12:209-217, Mar. 5, 2009.

Do, Linh D. et al., "Environmentally Friendly Vegetable Oil Microemulsions Using Extended Surfactants and Linkers", J Surfact. Deterg., 12:91-99, 2009.

Griffith, C. J. et al., "An evaluation of hospital cleaning regimes and standards", Journal of Hospital Infection, 45:19-28, 2000.

Hartel, Peter G. et al., "Exposing water samples to ultraviolet light improves fluorometry for detecting human fecal contamination", Water Research 41, 3629-3642, 2007.

Lipscomb, I. P. et al., "Rapid method for the sensitive detection of protein contamination on surgical instruments", Journal of Hospital Infection, 62, 141-148, 2006.

Lu, Y. F. et al., "Laser surface cleaning and real-time monitoring", Proceedings of SPIE, vol. 4070, 331-337, 2000.

Mori, F. et al., "Equilibrium and dynamic behavior of a system containing a mixture of anionic and nonionic surfactants" Progress in Colloid & Polymer Science, 82:114-121, 1990.

Phan, Tri T. et al., "Microemulsion-Based Vegetable Oil Detergency Using an Extended Surfactant", J. Surfact. Deterg., 13:313-319, Mar. 2010.

Pyrek, Kelly, Virgo Publishing, "Hospitals Can Learn from CSI Sleuthing Methods", www.infectioncontroltoday.com, 1 page, posted Jun. 9, 2008.

Salo, Satu et al., "Cleaning validation of fermentation tanks" Food and Bioproducts Processing 86, 204-210, 2008.

Huntsman Corporation, "Surfonic® L24-7 Surfactant", Technical Bulletin, pp. 1-2, 2007.

Witthayapanyanon, Anuradee et al., "Interfacial Properties of Extended-Surfactant-Based Microemulsions and Related Macroemulsions" J. Surfact. Deterg., 13:127-134, 2010.

(56) References Cited

OTHER PUBLICATIONS

Zhang, Hui et al., "Lauryl Alcohol and Amine Oxide as Foam Stabilizers in the Presence of Hardness and Oily Soil" Journal of Surfactants and Detergents, vol. 8, No. 1, pp. 99-107, 2005.
Plurafac® RA 300 Alcohol Alkoxylate, Technical Bulletin, BASF Corporation, 1 page, 2011.

* cited by examiner

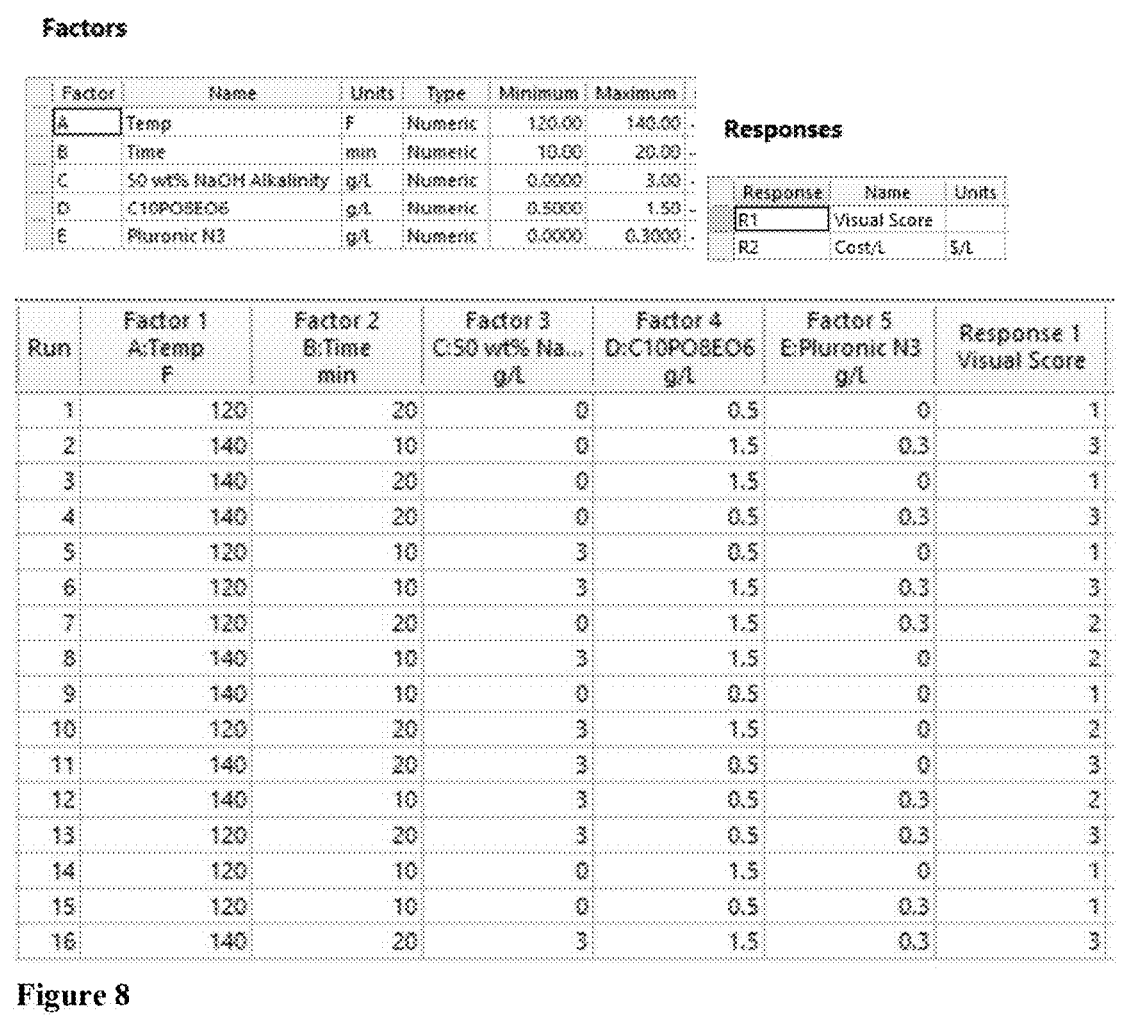

Factors

| Factor | Name | Units | Type | Minimum | Maximum |
|---|---|---|---|---|---|
| A | Temp | F | Numeric | 120.00 | 140.00 |
| B | Time | min | Numeric | 10.00 | 20.00 |
| C | 50 wt% NaOH Alkalinity | g/L | Numeric | 0.0000 | 3.00 |
| D | C10PO8EO6 | g/L | Numeric | 0.5000 | 1.50 |
| E | Pluronic N3 | g/L | Numeric | 0.0000 | 0.3000 |

Responses

| Response | Name | Units |
|---|---|---|
| R1 | Visual Score | |
| R2 | Cost/L | $/L |

| Run | Factor 1 A:Temp F | Factor 2 B:Time min | Factor 3 C:50 wt% Na... g/L | Factor 4 D:C10PO8EO6 g/L | Factor 5 E:Pluronic N3 g/L | Response 1 Visual Score |
|---|---|---|---|---|---|---|
| 1 | 120 | 20 | 0 | 0.5 | 0 | 1 |
| 2 | 140 | 10 | 0 | 1.5 | 0.3 | 3 |
| 3 | 140 | 20 | 0 | 1.5 | 0 | 1 |
| 4 | 140 | 20 | 0 | 0.5 | 0.3 | 3 |
| 5 | 120 | 10 | 3 | 0.5 | 0 | 1 |
| 6 | 120 | 10 | 3 | 1.5 | 0.3 | 3 |
| 7 | 120 | 20 | 0 | 1.5 | 0.3 | 2 |
| 8 | 140 | 10 | 3 | 1.5 | 0 | 2 |
| 9 | 140 | 10 | 0 | 0.5 | 0 | 1 |
| 10 | 120 | 20 | 3 | 1.5 | 0 | 2 |
| 11 | 140 | 20 | 3 | 0.5 | 0 | 3 |
| 12 | 140 | 10 | 3 | 0.5 | 0.3 | 2 |
| 13 | 120 | 20 | 3 | 0.5 | 0.3 | 3 |
| 14 | 120 | 10 | 0 | 1.5 | 0 | 1 |
| 15 | 120 | 10 | 0 | 0.5 | 0.3 | 1 |
| 16 | 140 | 20 | 3 | 1.5 | 0.3 | 3 |

Figure 8

ANOVA for selected factorial model

Response 1: Visual Score

Factor coding is Coded.
Sum of squares is Type III - Partial

| Source | Sum of Squares | df | Mean Square | F-value | p-value | |
|---|---|---|---|---|---|---|
| Model | 10.75 | 6 | 1.79 | 12.90 | 0.0006 | significant |
| A-Temp | 1.0000 | 1 | 1.0000 | 7.20 | 0.0251 | |
| B-Time | 1.0000 | 1 | 1.0000 | 7.20 | 0.0251 | |
| C-50 wt% NaOH Alkalinity | 2.25 | 1 | 2.25 | 16.20 | 0.0030 | |
| D-C10PO8EO6 | 0.2500 | 1 | 0.2500 | 1.80 | 0.2126 | |
| E-Pluronic N3 | 4.00 | 1 | 4.00 | 28.80 | 0.0005 | |

Design-Expert® Software
(Beta)
Factor Coding: Actual

Visual Score
X1 = C: 50 wt% NaOH Alkalinity
X2 = D: C10PO8EO6
X3 = E: Pluronic N3

Actual Factors
A: Temp = 130
B: Time = 15

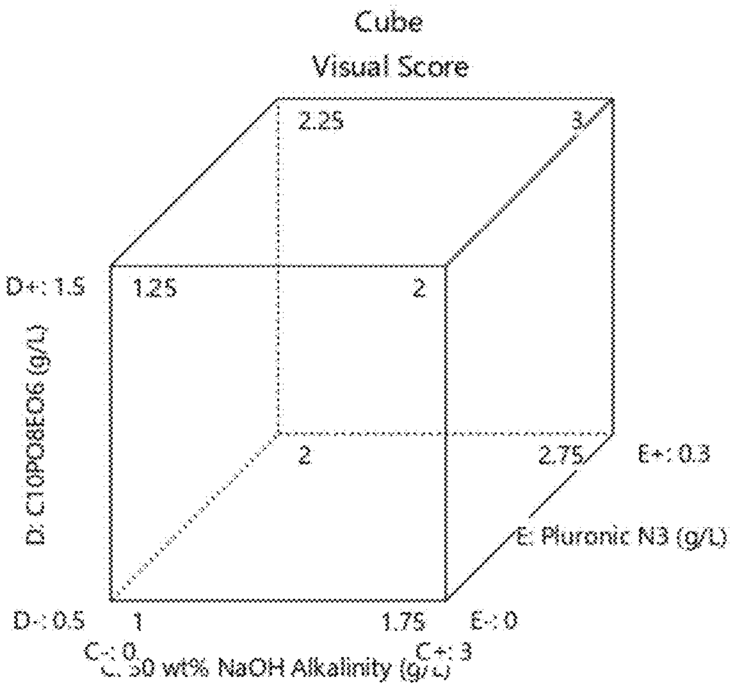

Figure 9

METHODS OF CLEANING AND SOIL RELEASE OF HIGHLY OIL ABSORBING SUBSTRATES EMPLOYING OPTIMIZED EXTENDED CHAIN NONIONIC SURFACTANTS

CROSS-REFERENCE TO RELATED APPLICATIONS

This application is a continuation application of U.S. Ser. No. 16/947,732, filed on Aug. 13, 2020, which claims priority under 35 U.S.C. § 119 to provisional application Ser. No. 62/886,483, filed Aug. 14, 2019, herein incorporated by reference in its entirety.

FIELD

Embodiments herein relate to compositions utilized as laundry detergents employing optimized guerbet C10 to C12 extended nonionic surfactants. These optimized extended surfactants have many benefits including the ease of formation of microemulsions, the formation of microemulsions that are non-gelling, have low viscosity and superwetting properties. The detergent compositions and methods of employing the same are particularly suitable for extremely difficult to remove soils on textiles including cosmetic soils and food oils such as non-trans fats.

BACKGROUND

Surfactants reduce the surface tension of water by adsorbing at the liquid-gas interface. They also reduce the interfacial tension between oil and water by adsorbing at the liquid-liquid interface. Surfactants are a primary component of most detergents and rinse aids. When dissolved in water, surfactants give a product the ability to remove dirt from surfaces. Each surfactant molecule has a hydrophilic head that is attracted to water molecules and a hydrophobic tail that repels water and simultaneously attaches itself to oil and grease in dirt. These opposing forces loosen the dirt and suspend it in the water.

Surfactants do the basic work of detergents and cleaning compositions by breaking up stains and keeping the dirt in the water solution to prevent re-deposition of the dirt onto the surface from which it has just been removed. Surfactants disperse and, in some cases, suspend dirt that normally does not dissolve in water and, in the case of rinse aids strip left over grease, allow the suspended dirt to be washed away, and provide wetting and sheeting action to promote faster drying.

Nonylphenol ethoxylates (NPEs) are predominantly used as industrial and domestic detergents as a surfactant. However, while effective, NPEs are disfavored due to environmental concerns. For example, NPEs are formed through the combination of ethylene oxide with nonylphenol (NP). Both NP and NPEs exhibit estrogen-like properties and may contaminate water, vegetation and marine life. NPE is also not readily biodegradable and remains in the environment or food chain for indefinite time periods.

An alternative to NPEs are alcohol ethoxylates (AEs). These alternatives are less toxic and degrade more quickly in the environment. However, it has recently been found that textiles washed with NPE free and phosphorous free detergents containing AEs smoke when exposed to high heat, e.g., in a steam tunnel in industrial laundry processes, or when ironed.

Surfactants are often incorporated in a cleaning composition to clean soiled surfaces. One of the preferred mechanisms is by microemulsifying these soils. Surfactants are also often incorporated into an oil-in-water microemulsion to make oil containing products appear more homogenous. These oil containing products include a variety of different surfactant systems in 5-20% solubilized oil which may be used as is or are then diluted with water prior to use. Examples of these oil containing products include cosmetics products containing oil for skin protection and cleaning products containing oily solvents for degreasing such as terpene and other water immiscible solvents. The surfactant systems generally employed in these cleaning products include a mixture of anionic or non-ionic surfactants and a short chain alcohol to help solubilize the oil phase and prevent liquid crystal formation. While short chain alcohols are effective, they also contribute to the volatile organic solvent content (VOC) of the product and pose flammability problems.

As can be seen there is a continuing need to develop effective, environmentally friendly, and safe surfactants and surfactant systems that can be used in cleaners of all kinds. This is particularly so in light of several new cleaning challenges that have emerged.

Health authorities have recently recommended that trans fats be reduced or eliminated in diets because they present health risks. In response, the food industry has largely replaced the use of trans fats with non-trans fats. These types of non-trans fats are the most difficult to remove from surfaces. The food industry and textile cleaning industry have also experienced an unexplained higher frequency of laundry fires. Textile items such as rags that are not effectively washed to better remove non-trans fats, are prone to cause fire due their substantial heat of polymerization of the trans fats. Non-trans fats have conjugated double bonds that can polymerize and the substantial heat of polymerization involved can cause fire, for example, in a pile of rags used to mop up these non-trans fat soils.

As can be seen, there is a need in the industry for improvement of cleaning compositions, such as hard surface cleaners, rinse aids, and laundry detergents and specifically the surfactants used therein so that difficult soils can be removed in a safe environmentally friendly and effective manner.

SUMMARY

The compositions disclosed meet the needs above by providing surfactant systems, mixtures or blends including optimized extended chain nonionic surfactants. The mixtures form stable microemulsions with oils and fatty acids which can be the resultant product, such as lubricants, sunscreens, or triglyceride-based products. The mixtures also improve the ease of formation of microemulsions, as well with resultant microemulsions that are non-gelling, have low viscosity and superwetting properties. These can be used in detergents, rinse aids and the like and form microemulsions without the need for linker or other cosurfactants.

In another embodiment the surfactant system or mixture can be used in a cleaning or detergent composition to emulsify, and microemulsify oils and greasy soils, such as non-trans fats and fatty acids, from substrates/surfaces. The surfactant system can be used alone as a pretreatment, or as a part of a cleaning composition such as a laundry detergent, rinse aid, hard surface cleaner or other emulsion or microemulsion.

Uses and applications, include but are not limited to laundry cleaning, reduction of laundry fires due to non-trans fats, hard surface cleaning such as manual pot-n-pan cleaning, machine warewashing (pretreatment, detergent or rinse aid), all-purpose cleaning, floor cleaning, CIP cleaning, open facility cleaning, foam cleaning, vehicle cleaning, etc. One embodiment is also relevant to non-cleaning related uses and applications such as dry lubes, tire dressings, polishes, etc. as well as triglyceride based lotions, suntan lotions, potentially pharmaceutical emulsions and microemulsions.

The surfactant mixtures include surfactant systems based on one or more extended chain nonionic surfactants. Notably the surfactants do not need to be combined with linker co-surfactants. This system is highly effective at creating microemulsions with fatty acids and non-trans fats at relatively low temperatures and the use of various surfactants can be modified to form emulsions at different temperatures to allow one to design specific surfactant formations specific to a particular use. The surfactant systems can be used in formulations for laundry detergents, warewash detergents, rinse aids, hard surface cleaners, whether alkali or acid based or even by as a pre-spotting/pre-soaking.

According to at least one embodiment, certain optimized nonionic surfactants can be used as a rinse agent/de-foaming package to provide wetting plus stripping of oil. These surfactants can also form microemulsions without the need of linker cosurfactants.

Extended nonionic surfactants include those of the general formula:

$$R—[L]_x-[O—CH_2—CH_2]_y$$

Where R is the lipophilic moiety, a linear or branched, saturated or unsaturated, substituted or unsubstituted, aliphatic or aromatic hydrocarbon radical having from about 8 to 20 carbon atoms, L is a linking group, or extended hydrophobe such as a block of poly-propylene oxide, a block of poly-ethylene oxide, a block of poly-butylene oxide or a mixture thereof; x is the chain length of the linking group ranging from 5-25; and y is the average degree of ethoxylation ranging from 1-20. Applicant has found that when L is PO the superior extension length is 8 moles of PO. In a more preferred embodiment, the extended nonionic surfactants include Guerbet alcohol alkoxylates, such as $C_{10}$ Guerbet $(PO)_8EO_x$ where x is 3, 6, 8, or 10.

In a further aspect, a laundry detergent composition is provided which includes the surfactant system disclosed herein, and optionally an alkalinity source and an additional surfactant. The laundry detergent product being adapted according to an embodiment to readily dissolve and disperse non-trans fats in commercial, industrial, and personal laundry washing processes or in a pre-spotting treatment.

These and other objects, features and attendant advantages will become apparent to those skilled in the art from a reading of the following detailed description of the preferred embodiment and the appended claims.

BRIEF DESCRIPTION OF THE DRAWINGS

FIG. 8 shows the factors, responses, and runs for the Design of Experiment.

FIG. 9 shows the results for the Design of Experiment.

DETAILED DESCRIPTION

Figure 1:
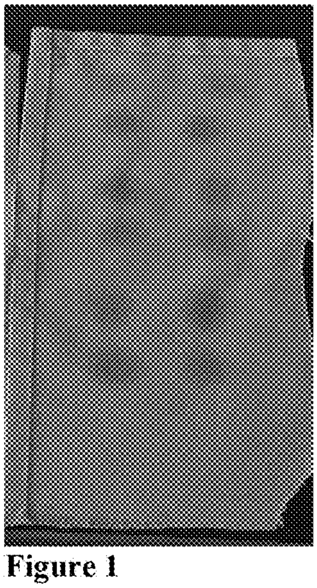
FIG. 1 shows a typical red napkin oil-stained sample before wash. From top to bottom: four drops of olive oil, four drops of Crisco oil, and four drops of corn oil. Each drop was 10 μl.
Figure 2:
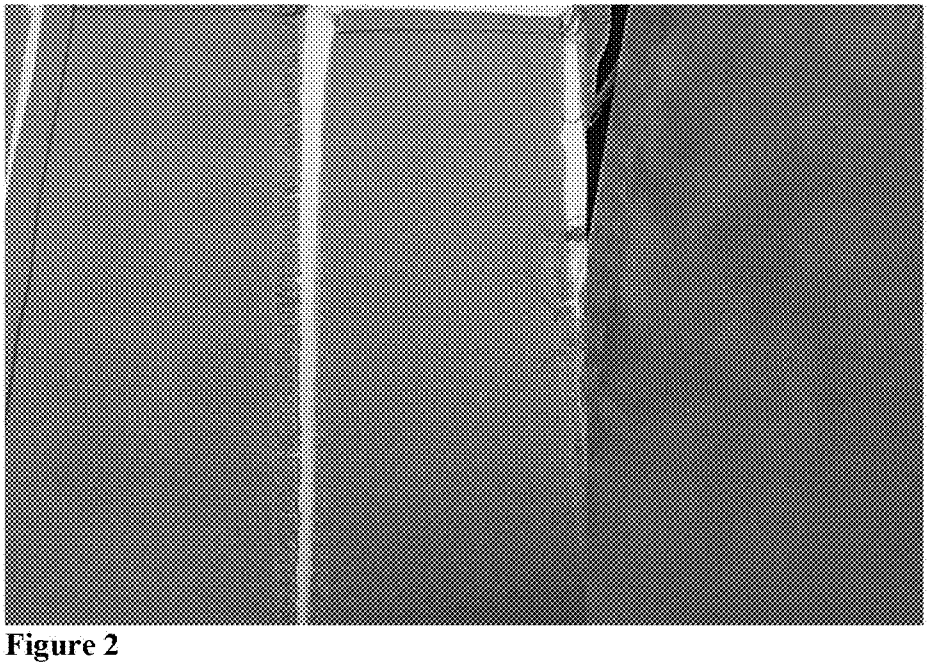
FIG. 2 shows typical wash results. From left to right: visible residue, no residue, and reverse residue. The napkins having visible residue as shown on the left were also used as previously tested samples.

The embodiments are not limited to particular detergent formulations, which can vary and are understood by skilled artisans. It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects are presented in a range format. It should be understood that the description in range format is merely for convenience and brevity and should not be construed as an inflexible limitation on the scope of the embodiments. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present disclosure may be more readily understood, certain terms are first defined. Unless defined otherwise, all technical and scientific terms used herein have the same meaning as commonly understood by one of ordinary skill in the art to which embodiments pertain. Many methods and materials similar, modified, or equivalent to those described herein can be used in the practice of the embodiments of disclosed herein without undue experimentation, the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term “about” also encompasses amounts that differ due to different equilibrium conditions for a composition resulting from a particular initial mixture. Whether or not modified by the term “about”, the claims include equivalents to the quantities.

The term “actives” or “percent actives” or “percent by weight actives” or “actives concentration” are used interchangeably herein and refers to the concentration of those ingredients involved in cleaning expressed as a percentage minus inert ingredients such as water or salts.

An “antiredeposition agent” refers to a compound that helps keep suspended in water instead of redepositing onto the object being cleaned. Antiredeposition agents are useful to assist in reducing redepositing of the removed soil onto the surface being cleaned.

As used herein, the term “cleaning” refers to a method used to facilitate or aid in soil removal, bleaching, microbial population reduction, and any combination thereof. As used herein, the term “microorganism” refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term “microbe” is synonymous with microorganism.

As used herein, the term “cleaning composition” includes, unless otherwise indicated, detergent compositions, laundry cleaning compositions, hard surface cleaning compositions, including pretreatments or rinse aids, and personal care cleaning compositions for use in the health and beauty area. Cleaning compositions include granular, powder, liquid, gel, paste, bar form and/or flake type cleaning agents, laundry detergent cleaning agents, laundry soak or spray treatments, fabric treatment compositions, dish washing detergents and soaps, shampoos, body washes and soaps, and other similar cleaning compositions. As used herein, the term “fabric treatment composition” includes, unless otherwise indicated, fabric softening compositions, fabric enhancing compositions, fabric freshening compositions and combinations thereof. Such compositions may be, but need not be rinse added compositions.

The term “electrolyte” refers to a substance that will provide ionic conductivity when dissolved in water or when in contact with it; such compounds may either be solid or liquid.

The term “hard surface” refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces and food processing surfaces, instruments and the like.

The term “soft surface” refers to a softer, highly flexible material such as fabric, carpet, hair, and skin.

The term “laundry” refers to items or articles that are cleaned in a laundry washing machine. In general, laundry refers to any item or article made from or including textile materials, woven fabrics, non-woven fabrics, and knitted fabrics. The textile materials can include natural or synthetic fibers such as silk fibers, linen fibers, cotton fibers, polyester fibers, polyimide fibers such as nylon, acrylic fibers, acetate fibers, and blends thereof including cotton and polyester blends. The fibers can be treated or untreated. Exemplary treated fibers include those treated for flame retardancy. It should be understood that the term “linen” is often used to describe certain types of laundry items including bed sheets, pillow cases, towels, table linen, table cloth, bar mops and uniforms.

As used herein, a “textile” is any woven or non-woven fabric or article, or garment including, but not limited to, all types found in the consumer, industrial, and/or institutional markets including, but not limited to, those made of cotton, poly-cotton blends, wool, aramids, polyurethanes, olefins, polyactids, nylons, silk, hemp, rayon, flax, jute, acrylics, polyesters, those made from many other synthetic or natural fibers and mixtures thereof.

As used herein, the term “microemulsion” refers to thermodynamically stable, isotropic dispersions consisting of nanometer size domains of water and/or oil stabilized by an interfacial film of surface-active agent characterized by ultra low interfacial tension.

As used herein, the term “phosphate-free” refers to a composition, mixture, or ingredient that does not contain a phosphate or phosphate-containing compound or to which a phosphate or phosphate-containing compound has not been added. Should a phosphate or phosphate-containing compound be present through contamination of a phosphate-free composition, mixture, or ingredients, the amount of phosphate shall be less than 0.5 wt %. More preferably, the amount of phosphate is less than 0.1 wt-%, and most preferably, the amount of phosphate is less than 0.01 wt %.

As used herein, the term “phosphorus-free” or “substantially phosphorus-free” refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than 0.5 wt %. More preferably, the amount of phosphorus is less than 0.1 wt-%, and most preferably the amount of phosphorus is less than 0.01 wt %.

As used herein, the term “caustic free” or “alkali caustic free” or “substantially caustic” or “substantially alkali caustic free” refers to a composition, mixture, or ingredient that does not contain significant residual and titrate-able carbonate alkalinity from alkali metal hydroxides such as sodium hydroxide or potassium hydroxide, or does not contain an alkali metal hydroxide-containing compound or to which alkali metal hydroxide-containing compound has not been added. The pH of such compositions or mixtures may be below a pH of about 9.0, below a pH of about 8.0 or below a pH of about 7.0. Should an alkali metal hydroxide-containing compound be present through contamination of an alkali metal hydroxide-free composition, mixture, or ingredients, the amount of alkali metal hydroxide or caustic component shall be less than about 0.5 wt %, or less than about 0.2 wt %. In some embodiments, an alkali metal hydroxide may be used in the composition, mixture, or ingredients for neutralization, stabilization, or pH adjustment purposes. If an alkali metal hydroxide is included for such a purpose, the amount of alkali metal hydroxide or caustic component shall be less than about 10.0 wt %, than about 5.0 wt%, or than about 2.0 wt %.

As used herein, the term “polymer” generally includes, but is not limited to, homopolymers, copolymers, such as for example, block, graft, random and alternating copolymers, terpolymers, and higher “x” mers, further including their derivatives, combinations, and blends thereof. Furthermore, unless otherwise specifically limited, the term “polymer” shall include all possible isomeric configurations of the molecule, including, but are not limited to isotactic, syndiotactic and random symmetries, and combinations thereof.

Furthermore, unless otherwise specifically limited, the term "polymer" shall include all possible geometrical configurations of the molecule.

"Soil" or "stain" refers to a non-polar oily substance which may or may not contain particulate matter such as mineral clays, sand, natural mineral matter, carbon black, graphite, kaolin, environmental dust, etc.

As used herein, the term "soil" or "stain" refers to a non-polar oily substance which may or may not contain particulate matter such as mineral clays, sand, natural mineral matter, carbon black, graphite, kaolin, environmental dust, etc.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

The term "surfactant" as used herein is a compound that contains a lipophilic segment and a hydrophilic segment, which when added to water or solvents, reduces the surface tension of the system. An "extended chain surfactant" is a surfactant having an intermediate polarity linking chain, such as a block of poly-propylene oxide, or a block of poly-ethylene oxide, or a block of poly-butylene oxide or a mixture thereof inserted between the surfactant's conventional lipophilic segment and hydrophilic segment.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions disclosed include but are not limited to, those that include polypropylene polymers (PP), polycarbonate polymers (PC), melamine formaldehyde resins or melamine resin (melamine), acrilonitrile-butadiene-styrene polymers (ABS), and polysulfone polymers (PS). Other exemplary plastics that can be cleaned using the compounds and compositions disclosed include polyethylene terephthalate (PET) and polystyrene polyamide.

The term "weight percent," "wt.-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt.-%," etc.

The methods and compositions may comprise, consist essentially of, or consist of the components and ingredients disclosed as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

So that the disclosure maybe more readily understood, certain terms are first defined, and certain test methods are described.

Surfactant Systems Employing Optimized Nonionic Extended Chain Surfactants

Spun polyester napkins and uniforms have built-in capillary channels and behave like oil sponges. Food oils such as non-trans fats, once soaked up by these capillary channels, are extremely difficulty to remove. In-line laundry formulas, and even together with high dose of alkali, have difficulty removing these food oils. Rejection rates of 50% or above have been common.

Similarly, cosmetic soils are notoriously difficult to remove because they are oily and waxy. There is great need to come up with innovative ways to remove these cosmetic soils. The surfactant system or mixture described herein are optimized for these difficult soil removal situations and employs one or more extended chain nonionic surfactants. These are surfactants that have an intermediate polarity poly-alkylene oxide chain (or linker) inserted between the lipophilic tail group and hydrophilic polar head, which may be anionic or nonionic.

Examples of lipophilic tail groups include hydrocarbons, alkyl ether, fluorocarbons or siloxanes. Examples of anionic hydrophilic polar heads of the extended surfactant include, but are not necessarily limited to, groups such as sulfate, polyoxyethylene sulfate, ethoxysulfate, carboxylate, ethoxy-carboxylate, phosphate, ethoxyphosphates. Examples of nonionic hydrophilic polar heads of the extended surfactant include, but are not necessarily limited to, groups such as polyoxyethylene, C6 sugar, xylitol, di-xylitol, ethoxy-xylitol, and glucose.

Extended surfactants include a linker polyalkylene glycol link.

The general formula for a nonionic extended surfactant is $$R—[L]_x—[O—CH_2—CH_2]_y$$

where R is the lipophilic moiety, such as a linear or branched, saturated or unsaturated, substituted or unsubstituted, aliphatic or aromatic hydrocarbon radical having from about 8 to 20 carbon atoms, L is a linking group, such as a block of poly-alkylene oxide, preferably polypropylene oxide; x is the chain length of the linking group ranging from 2-25; and y is the average degree of ethoxylation ranging from 1-18. In a preferred embodiment, applicants have found that use of a nonionic surfactant with enough PO extension as the main surfactant (and only) can form liquid single phase microemulsions. PO length is optimized at from about 5 to about 8 moles of PO. This length of PO extension provides a lower foam profile. Applicants have further found that R groups that are a branched hydrophobe such as a guerbet alcohol are better for protein soil defoaming Preferred extended surfactants include: branched Guerbet alcohol alkoxylates; such as $C_y(PO)_8(EO)_x$ (x=3,6,8,10) (y=10-12) also, extended linear alcohol alkoxylates; $C_{(12-14)}(PO)_{16}(EO)_x$ (x=6,12,17).

Branched Alcohol Alkoxylates

Preferred branched alcohol alkoxylates include Guerbet ethoxylates. Guerbet ethoxylates suitable for use herein have the following formula:

$$CH_3(CH_2)_nCH(R^1)CH_2O(CH_2CH(R^2)O)_mH$$

In an embodiment the Guerbet ethoxylate is further defined wherein $R^1$ is C2-C20 alkyl and $R^2$ is H or C1-C4 alkyl. In a further embodiment, the Guerbet ethoxylate is defined wherein "n" is an integer between 2 and 20 and wherein "m" is an integer between 1 and 40.

In another embodiment, the branched alcohol alkoxylate is a Guerbet ethoxylate that is prepared from a Guerbet alcohol by dimerization of alkenes (e.g. butane).

The branched alcohol alkoxylates, including Guerbet ethoxylates, can be prepared according to U.S. Pat. Nos. 6,906,320, 6,737,553 and 5,977,048, the disclosure of these patents are herein incorporated by reference in their entirety. Exemplary branched alcohol alkoxylates include those available under the tradenames Lutensol XP-30 and Lutensol XP-50 (BASF Corporation). In general, Lutensol XP-30 can be considered to have 3 repeating ethoxy groups, and Lutensol XP-50 can be considered to have 5 repeating ethoxy groups.

Branched alcohol alkoxylates can be classified as relatively water insoluble or relatively water soluble. In general, a water insoluble branched alcohol alkoxylate can be considered an alkoxylate that, when provided as a composition containing 5 wt.-% of the branched alcohol alkoxylate and 95 wt.-% water, has a tendency to phase separate. Lutensol XP-30 and Lutensol XP-50 from BASF Corporation are examples of water-insoluble branched alcohol alkoxylates.

According to an embodiment, a branched alcohol alkoxylate, preferably a water-insoluble Guerbet ethoxylate has from about 10 wt.-% to about 90 wt.-% ethylene oxide, from about 20 wt.-% to about 70 wt.-% ethylene oxide preferably from about 30 wt.-% to about 60 wt.-% ethylene oxide.

Applicants have further found that use of capped extended nonionic surfactants lowers the foam profile of the composition and foam from protein soil.

Capped extended nonionic surfactants can include:

$$R—[PO]_x-[EO]_y[N]z$$

Where N is a capping group such as an alkyl group such as methyl, benzyl, butyl, etc.; a PO group of from 1-5 length, in length. These capped nonionic surfactants have lowered foam profiles and the like are effective for rinse aid formulations and detergents.

These extended chain surfactants attain low tension and/or high solubilization, and can from a single phase microemulsion with oils, such as non-trans fats with additional beneficial properties including, but not necessarily limited to, tunability to temperature and irreversibility within the microemulsion forming temperature range. For example, in one embodiment the emulsions or microemulsions may function over a relatively wide temperature range of from about 80° to 190° C. For example with a PO length of 8, and R as a Guerbet alcohol, extended nonionic surfactants tested formed stable microemulsions for 3EO at 90°-80°; 6 EO at 160°-120°; 8EO 150°-185° and 10 EO 165°-190°. Thus one can customize the extended nonionic surfactant for the type of cleaning system used, and at what temperature one wants the micro emulsion to form.

Many extended chain anionic and nonionic surfactants are commercially available from a number of sources. Table 1 is a representative, nonlimiting listing of several examples of the same.

TABLE 1

| Extended Surfactants | Source | % Active | Structure |
|---|---|---|---|
| Plurafac SL-42(nonionic) | BASF | 100 | $C_{6-10}$-$(PO)_3(EO)_6$ |
| Plurafac SL-62(nonionic) | BASF | 100 | $C_{6-10}$-$(PO)_3(EO)_8$ |
| Lutensol XL-40(nonionic) | BASF | 100 | (3 propyl heptanol |
| Lutensol XL-50(nonionic) | BASF | 100 | Guerbet alcohol series) |
| Lutensol XL-60(nonionic) | BASF | 100 | $C_{10}$-$(PO)_a(EO)_b$ series, |
| Lutensol XL-70(nonionic) | BASF | 100 | where a is 1.0 to 1.5, and |
| Lutensol XL-79(nonionic) | BASF | 85 | b is 4 to 14. |
| Lutensol XL-80(nonionic) | BASF | 100 | |
| Lutensol XL-89(nonionic) | BASF | 80 | |
| Lutensol XL-90 (nonionic) | BASF | 100 | |
| Lutensol XL-99 (nonionic) | BASF | 80 | |
| Lutensol XL-100 (nonionic) | BASF | 100 | |
| Lutensol XL-140 (nonionic) | BASF | 100 | |
| New surfactant designed by Ecolab | | 100 | C10 Guerbet alcohol $(PO)_8(EO)_3$ |
| New surfactant designed by Ecolab | | 100 | C10 Guerbet alcohol $(PO)_8(EO)_6$ |
| New surfactant designed by Ecolab | BASF | 100 | C10 Guerbet alcohol $(PO)_8(EO)_8$ |
| New surfactant designed by Ecolab | BASF | 100 | C10 Guerbet alcohol $(PO)_8(EO)_{10}$ |
| Ecosurf EH-3 (nonionic) | Dow | 100 | 2-Ethyl Hexyl |
| Ecosurf EH-6 (nonionic) | Dow | 100 | $(PO)_m(EO)_n$ |
| Ecosurf EH-9(nonionic) | Dow | 100 | series |
| Ecosurf SA-4(nonionic) | Dow | 100 | $C_{6-12}$ $(PO)_{3-4}$ $(EO)_4$ |
| Ecosurf SA-7 (nonionic) | Dow | 100 | $C_{6-12}$ $(PO)_{3-4}$ $(EO)_7$ |
| Ecosurf SA-9 (nonionic) | Dow | 100 | $C_{6-12}$ $(PO)_{3-4}$ $(EO)_9$ |
| Surfonic PEA-25(nonionic) | Huntsman | 100 | $C_{12-14}(PO)_2N[(EO)_{2.5}\}_2$ |
| X-AES (anionic) | Huntsman | 23 | $C_{12-14}$-$(PO)_{16}$-$(EO)_2$-sulfate |
| X-LAE6 (nonionic) | Huntsman | 100 | $C_{12-14}$-$(PO)_{16}(EO)_6$ |
| X-LAE12 (nonionic) | Huntsman | 100 | $C_{12-14}$-$(PO)_{16}(EO)_{12}$ |
| X-LAE17 (nonionic) | Huntsman | 100 | $C_{12-14}$-$(PO)_{16}(EO)_{17}$ |
| Alfoterra 123-4S (anionic) | Sasol | 30 | $C_{12-13}$-$(PO)_4$-sulfate |
| Alfoterra 123-8S (anionic) | Sasol | 30 | $C_{12-13}$-$(PO)_8$-sulfate |
| Marlowet 4561 (nonionic under acidic condition, anionic under alkaline condition) | Sasol | 90 | $C_{16-18}(PO)_4(EO)_5$-carboxylic acid |
| Marlowet 4560 (nonionic under acidic condition, anionic under alkaline condition) | Sasol | 90 | $C_{16-18}(PO)_4(EO)_2$-carboxylic acid |
| Marlowet 4539 (nonionic under acidic condition, anionic under alkaline condition) | Sasol | 90 | Iso $C_9$-$(PO)_2EO_2$-carboxylic acid |
| LP-6818-41-IP2 | Exp | 100 | $C_{12-14}$-$(PO)_4$ |
| LP-6818-41-IP3 | Exp | 100 | $C_{12-14}$-$(PO)_6$ |
| LP-6818-41-IP4 | Exp | 100 | $C_{12-14}$-$(PO)_8$ |
| LP-6818-47-IP5 | Exp | 100 | $C_{12-14}$-$(PO)_4(EO)_{12}$ |
| LP-6818-47-IP6 | Exp | 100 | $C_{12-14}$-$(PO)_4(EO)_{14}$ |
| LP-6818-47-IP7 | Exp | 100 | $C_{12-14}$-$(PO)_4(EO)_{16}$ |
| LP-6818-49-FB | Exp | 100 | $C_{12-14}$-$(PO)_4(EO)_{18}$ |
| LP-6818-51-IP1 | Exp | 100 | $C_{12-14}$-$(PO)_6(EO)_{14}$ |
| LP-6818-51-IP2 | Exp | 100 | $C_{12-14}$-$(PO)_6(EO)_{16}$ |
| LP-6818-53-IP3 | Exp | 100 | $C_{12-14}$-$(PO)_6(EO)_{18}$ |
| LP-6818-53-FB | Exp | 100 | $C_{12-14}$-$(PO)_6(EO)_{20}$ |
| LP-6818-66-IP2 | Exp | 100 | TDA-$(PO)_4$ |
| LP-6818-67-IP3 | Exp | 100 | TDA-$(PO)_4(EO)_8$ |
| LP-6818-67-IP4 | Exp | 100 | TDA-$(PO)_4(EO)_{10}$ |
| LP-6818-67-IP5 | Exp | 100 | TDA-$(PO)_4(EO)_{12}$ |
| LP-6818-68-IP5 | | | |
| LP-6818-68-IP6 | Exp | 100 | TDA-$(PO)_4(EO)_{14}$ |
| LP-6818-68-FB | Exp | 100 | TDA-$(PO)_4(EO)_{18}$ |
| | Exp | 100 | $C_{12-14}$-$(PO)_{20}(EO)_2$ |
| | Exp | 100 | $C_{12-14}$-$(PO)_{20}(EO)_4$ |
| | Exp | 100 | $C_{12}$-$(PO)_{20}(EO)_6$ |

TABLE 1-continued

| Extended Surfactants | Source | % Active | Structure |
|---|---|---|---|
| Isofol 12 PO5EO5 | Exp | 100 | Guerbet $C_{12}$-$(PO)_5(EO)_5$ |
| Isofol 12 PO5EO8 | Exp | 100 | Guerbet $C_{12}$-$(PO)_5(EO)_8$ |
| Isofol 12 PO8EO5 | Exp | 100 | Guerbet $C_{12}$-$(PO)_8(EO)_5$ |
| Isofol 12 PO8EO8 | Exp | 100 | Guerbet $C_{12}$-$(PO)_8(EO)_8$ |
| Capped | | | |
| Triton DF-12 | DOW | 100 | $C_{8\text{-}10}$-$(PO)_2(EO)_{11}$-Benzyl |

** Exp are manufactured by Ecolab

A nonionic extended chain surfactant is employed as a surfactant component in cleaning, rinsing, degreasing, and other formulations. The nonionic surfactants have been optimized to form stable microemulsions without the need for co-surfactants.

According to an embodiment, emulsions or microemulsions of different temperature range that are stable and irreversible, i.e. the emulsion or microemulsion does not revert as it stays in the specific temperature range. The surfactant system is capable of forming emulsions or microemulsions with, or in cleaning compositions for removing or treated stains caused by oils and fatty acids including hydrocarbon type oils, vegetable oils, organic oils, mineral oils, synthetic oils, petrochemical oils, volatile essential oils, including fatty acids, lipids as well as triglycerides.

This feature may be used for removal of the oils in cleaning products or in any other product which requires an oil emulsion or microemulsion such as lubricants, suntan lotions, pharmaceutical applications hair products such as shampoos, gels, conditioners and the like, Petroleum products such as diesel fuel (petrodiesel), ethane (and other short-chain alkanes), fuel oils (heaviest of commercial fuels, used in ships/furnaces), gasoline (petrol), jet fuel, kerosene, and liquefied petroleum gas, Lubrication products for various personal and engineering purposes, detergents, fertilizers, medicines, paints, plastics, synthetic fibers, and synthetic rubber.

Cleaning Compositions Including Rinse Aids Comprising Extended Chain Nonionic Surfactants The surfactant system disclosed may be used alone, as a pre-treatment, pre-soak or pre-spot composition in combination with a traditional warewash, or laundry detergent or cleaner, or may be incorporated within a cleaning composition. The embodiments comprise both hard surface and soft surface cleaning compositions including the disclosed surfactant system. Applicants have found that the use of these optimized extended chain nonionic surfactants can radically cut down on the rejection rate after cleaning these heavily soiled spun polyester napkins, even with significantly lower or no alkali and across a wide temperature range of application.

Applicants also have discovered that these optimized extended chain nonionic surfactants can be used as a soil release agent to minimize or prevent the tenacious attachment of soils such as the cosmetics soil on the pretreated substrate, thus making subsequent cleaning much easier, sometimes even with just water rinsing without the use of detergents.

Cleaning Composition Formulations

In another embodiment a ware wash or laundry detergent which includes a builder, and other traditional components such as enzymes is contemplated. Examples of such standard laundry, warewash, and rinse aid components and formulations, which are well known to those skilled in the art, are provided in the following paragraphs.

The detergent or warewash composition can be provided in solid or liquid form and includes, for example, an alkalinity source, a metal protector (for warewash), a surfactant or surfactant system disclosed herein, water, and a threshold agent, and other optional components. Typical formulations can include from about 30% and about 80% by weight alkalinity source, between about 15% and about 35% by weight metal protector, between about 2% and about 10% by weight surfactant, between about 0.1% and about 20% by weight water, between about 0.2% and about 15% by weight threshold agent. If a scale inhibitor is present it is present in an amount of from about 0 to about 15% by weight.

In yet another embodiment, a hard surface cleaning composition is disclosed, with the surfactant system, an acid source or source of alkalinity, and optionally a solvent, a water conditioning agent, and water to make a hard surface cleaner which will be effective at removing greasy and oily soils from surfaces such as showers, sinks, toilets, bathtubs, countertops, windows, minors, transportation vehicles, floors, and the like.

These surfaces can be those typified as "hard surfaces" (such as walls, floors, bed-pans).

A typical hard surface formulation at about 18% activity includes between about 40 wt. % and about 80 wt. % surfactant system, between about 3 wt. % and about 18 wt. % water conditioning agent, between about 0.1 wt. % and about 0.55 wt. % acid or alkalinity source, between about 0 wt. % and about 10 wt. % solvent and between about 10 wt. % and about 60 wt. % water.

Particularly, the cleaning compositions include between about 45 wt. % and about 75 wt. % surfactant system, between about 0 wt. % and about 10 wt. % optional co-surfactant, between about 5 wt. % and about 15 wt. % water conditioning agent, between about 0.3 wt. % and about 0.5 wt. % acid or alkalinity source, between about 0 and about 6 wt. % solvent and between about 15 wt. % and about 50 wt. % water. In other embodiments, similar intermediate concentrations and use concentrations may also be present in the cleaning compositions.

Additional Components

While not essential for the purposes of the present embodiments, the non-limiting list of additional components illustrated hereinafter are suitable for use in the instant compositions and may be desirably incorporated in certain embodiments, for example to assist or enhance cleaning performance, for treatment of the substrate to be cleaned, or to modify the aesthetics of the cleaning composition as is the case with perfumes, colorants, dyes or the like. The precise nature of these additional components, and levels of incorporation thereof, will depend on the physical form of the composition and the nature of the cleaning operation for which it is to be used. Suitable additional materials include, but are not limited to, surfactants, builders, chelating agents, dye transfer inhibiting agents, viscosity modifiers, dispersants, additional enzymes, and enzyme stabilizers, catalytic materials, bleaches, bleach activators, hydrogen peroxide, sources of hydrogen peroxide, preformed peracids, polymeric dispersing agents, threshold inhibitors for hard water precipitation pigments, clay soil removal/anti-redeposition agents, brighteners, suds suppressors, dyes, fabric hueing agents, perfumes, structure elasticizing agents, fabric softeners, carriers, hydrotropes, processing aids, solvents, pigments antimicrobials, pH buffers, processing aids, active fluorescent whitening ingredient, additional surfactants and mixtures thereof. In addition to the disclosure below, suitable examples of such other adjuncts and levels of use are found in U.S. Pat. Nos. 5,576,282, 6,306,812 B1 and 6,326,348 B1 that are incorporated by reference.

As stated, the adjunct ingredients are not essential to Applicants' compositions. Thus, certain embodiments of Applicants' compositions do not contain additional materials. However, when one or more additional materials are present, such one or more additional components may be present as detailed below:

The liquid detergent herein has a neat pH of from about 7 to about 13, or about 7 to about 9, or from about 7.2 to about 8.5, or from about 7.4 to about 8.2. The detergent may contain a buffer and/or a pH-adjusting agent, including inorganic and/or organic alkalinity sources and acidifying agents such as water-soluble alkali metal, and/or alkali earth metal salts of hydroxides, oxides, carbonates, bicarbonates, borates, silicates, phosphates, and/or metasilicates; or sodium hydroxide, potassium hydroxide, pyrophosphate, orthophosphate, polyphosphate, and/or phosphonate. The organic alkalinity source herein includes a primary, secondary, and/or tertiary amine The inorganic acidifying agent herein includes HF, HCl, HBr, HI, boric acid, sulfuric acid, phosphoric acid, and/or sulphonic acid; or boric acid. The organic acidifying agent herein includes substituted and substituted, branched, linear and/or cyclic $C_{1-30}$ carboxylic acid.

Bleaching Agents—The cleaning compositions may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions may comprise from about 0.1% to about 50% or even from about 0.1% to about 25% bleaching agent by weight of the subject cleaning composition. Examples of suitable bleaching agents include: (1) preformed peracids: Suitable preformed peracids include, but are not limited to, compounds selected from the group consisting of percarboxylic acids and salts, percarbonic acids and salts, perimidic acids and salts, peroxymonosulfuric acids and salts, for example, Oxzone®, and mixtures thereof. Suitable percarboxylic acids include hydrophobic and hydrophilic peracids having the formula R—(C—O)O—O-M wherein R is an alkyl group, optionally branched, having, when the peracid is hydrophobic, from 6 to 14 carbon atoms, or from 8 to 12 carbon atoms and, when the peracid is hydrophilic, less than 6 carbon atoms or even less than 4 carbon atoms; and M is a counterion, for example, sodium, potassium or hydrogen; (2) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect, the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall composition and are typically incorporated into such compositions as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and(3) bleach activators having R—(C—O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect the subject cleaning composition may comprise NOBS, TAED or mixtures thereof.

When present, the peracid and/or bleach activator is generally present in the composition in an amount of from about 0.1 to about 60 wt %, from about 0.5 to about 40 wt % or even from about 0.6 to about 10 wt % based on the composition. One or more hydrophobic peracids or precursors thereof may be used in combination with one or more hydrophilic peracid or precursor thereof.

The amounts of hydrogen peroxide source and peracid or bleach activator may be selected such that the molar ratio of available oxygen (from the peroxide source) to peracid is from 1:1 to 35:1, or even 2:1 to 10:1.

Additional Surfactant—In some embodiments, the compositions include one or more additional surfactants. Additional surfactants can be anionic, nonionic, cationic zwitterionic and can also include additional extended chain surfactant as discussed herein.

The cleaning composition can contain an anionic surfactant component that includes a detersive amount of an anionic surfactant or a mixture of anionic surfactants.

In certain embodiments the anionic surfactant can be an extended anionic surfactant. In some instances, the compositions can further include an extended anionic surfactant. Anionic extended surfactants generally have the formula $$R—[L]_x—[O—CH_2—CH_2]_y—M$$

where M is any ionic species such as carboxylates, sulfonates, sulfates, and phosphates. A cationic species will generally also be present for charge neutrality such as hydrogen, an alkali metal, alkaline earth metal, ammonium and ammonium ions which may be substituted with one or more organic groups.

Anionic surfactants are desirable in cleaning compositions because of their wetting and detersive properties. The anionic surfactants that can be used include any anionic surfactant available in the cleaning industry. Suitable groups of anionic surfactants include sulfonates and sulfates. Suitable surfactants that can be provided in the anionic surfactant component include alkyl aryl sulfonates, secondary alkane sulfonates, alkyl methyl ester sulfonates, alpha olefin sulfonates, alkyl ether sulfates, alkyl sulfates, and alcohol sulfates.

Suitable alkyl aryl sulfonates that can be used in the cleaning composition can have an alkyl group that contains 6 to 24 carbon atoms and the aryl group can be at least one of benzene, toluene, and xylene. A suitable alkyl aryl sulfonate includes linear alkyl benzene sulfonate. A suitable linear alkyl benzene sulfonate includes linear dodecyl benzyl sulfonate that can be provided as an acid that is neutralized to form the sulfonate. Additional suitable alkyl aryl sulfonates include xylene sulfonate and cumene sulfonate.

Suitable alkane sulfonates that can be used in the cleaning composition can have an alkane group having 6 to 24 carbon atoms. Suitable alkane sulfonates that can be used include secondary alkane sulfonates. A suitable secondary alkane sulfonate includes sodium $C_{14}$-$C_{17}$ secondary alkyl sulfonate commercially available as Hostapur SAS from Clamant.

Suitable alkyl methyl ester sulfonates that can be used in the cleaning composition include those having an alkyl group containing 6 to 24 carbon atoms. Suitable alpha olefin sulfonates that can be used in the cleaning composition include those having alpha olefin groups containing 6 to 24 carbon atoms.

Suitable alkyl ether sulfates that can be used in the cleaning composition include those having between about 1 and about 10 repeating alkoxy groups, between about 1 and about 5 repeating alkoxy groups. In general, the alkoxy group will contain between about 2 and about 4 carbon atoms. A suitable alkoxy group is ethoxy. A suitable alkyl ether sulfate is sodium lauryl ether sulfate and is available under the name Steol CS-460.

Suitable alkyl sulfates that can be used in the cleaning composition include those having an alkyl group containing 6 to 24 carbon atoms. Suitable alkyl sulfates include, but are not limited to, sodium lauryl sulfate and sodium lauryl/myristyl sulfate.

Suitable alcohol sulfates that can be used in the cleaning composition include those having an alcohol group containing about 6 to about 24 carbon atoms.

The anionic surfactant can be neutralized with an alkaline metal salt, an amine, or a mixture thereof. Suitable alkaline metal salts include sodium, potassium, and magnesium. Suitable amines include monoethanolamine, triethanolamine, and monoisopropanolamine If a mixture of salts is used, a suitable mixture of alkaline metal salt can be sodium and magnesium, and the molar ratio of sodium to magnesium can be between about 3:1 and about 1:1.

The cleaning composition, when provided as a concentrate, can include the additional anionic surfactant component in an amount sufficient to provide a use composition having desired wetting and detersive properties after dilution with water. The concentrate can contain about 0.1 wt. % to about 0.5 wt. %, about 0.1 wt. % to about 1.0 wt. %, about 1.0 wt. % to about 5 wt. %, about 5 wt. % to about 10 wt. %, about 10 wt. % to about 20 wt. %, 30 wt. %, about 0.5 wt. % to about 25 wt. %, and about 1 wt. % to about 15 wt. %, and similar intermediate concentrations of the anionic surfactant.

The cleaning composition can contain a nonionic surfactant component that includes a detersive amount of nonionic surfactant or a mixture of nonionic surfactants. Nonionic surfactants can be included in the cleaning composition to enhance grease removal properties. Although the surfactant component can include a nonionic surfactant component, it should be understood that the nonionic surfactant component can be excluded from the detergent composition.

Additional nonionic surfactants that can be used in the composition include polyalkylene oxide surfactants (also known as polyoxyalkylene surfactants or polyalkylene glycol surfactants). Suitable polyalkylene oxide surfactants include polyoxypropylene surfactants and polyoxyethylene glycol surfactants. Suitable surfactants of this type are synthetic organic polyoxypropylene (PO)-polyoxyethylene (EO) block copolymers. These surfactants include a di-block polymer comprising an EO block and a PO block, a center block of polyoxypropylene units (PO), and having blocks of polyoxyethylene grafted onto the polyoxypropylene unit or a center block of EO with attached PO blocks. Further, this surfactant can have further blocks of either polyoxyethylene or polyoxypropylene in the molecules. A suitable average molecular weight range of useful surfactants can be about 1,000 to about 40,000 and the weight percent content of ethylene oxide can be about 10-80 wt %. Some examples of polyoxyethylene-polyoxypropylene block copolymers include those having the following formulae:

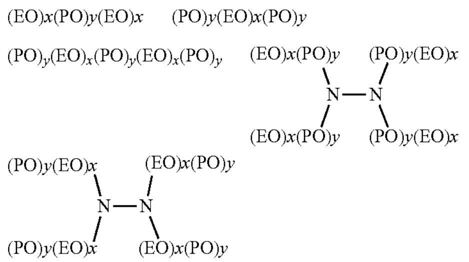

wherein EO represents an ethylene oxide group, PO represents a propylene oxide group, and x and y reflect the average molecular proportion of each alkylene oxide monomer in the overall block copolymer composition. In some embodiments, x is in the range of about 10 to about 130, y is in the range of about 15 to about 70, and x plus y is in the range of about 25 to about 200. It should be understood that each x and y in a molecule can be different. In some embodiments, the total polyoxyethylene component of the block copolymer can be in the range of at least about 20 mol-% of the block copolymer and in some embodiments, in the range of at least about 30 mol-% of the block copolymer. In some embodiments, the material can have a molecular weight greater than about 400, and in some embodiments, greater than about 500. For example, in some embodiments, the material can have a molecular weight in the range of about 500 to about 7000 or more, or in the range of about 950 to about 4000 or more, or in the range of about 1000 to about 3100 or more, or in the range of about 2100 to about 6700 or more.

Although the exemplary polyoxyethylene-polyoxypropylene block copolymer structures provided above have 3-8 blocks, it should be appreciated that the nonionic block copolymer surfactants can include more or less than 3 or 8 blocks. In addition, the nonionic block copolymer surfactants can include additional repeating units such as butylene oxide repeating units. Furthermore, the nonionic block copolymer surfactants that can be used can be characterized heteric polyoxyethylene-polyoxypropylene block copolymers. Some examples of suitable block copolymer surfactants include commercial products such as PLURONIC® and TETRONIC® surfactants, commercially available from BASF. For example, PLURONIC® 25-R2 is one example of a useful block copolymer surfactant commercially available from BASF.

Other nonionic surfactants include alcohol alkoxylates. An suitable alcohol alkoxylate include linear alcohol ethoxylates such as Tomadol™ 1-5 which is a surfactant containing an alkyl group having 11 carbon atoms and 5 moles of ethylene oxide. Additional alcohol alkoxylates include alkylphenol ethoxylates, branched alcohol ethoxylates, secondary alcohol ethoxylates (e.g., Tergitol 15-S-7 from Dow Chemical), castor oil ethoxylates, alkylamine ethoxylates, tallow amine ethoxylates, fatty acid ethoxylates, sorbital oleate ethoxylates, end-capped ethoxylates, or mixtures thereof. Additional nonionic surfactants include amides such as fatty alkanolamides, alkyldiethanolamides, coconut diethanolamide, lauric diethanolamide, polyethylene glycol cocoamide (e.g., PEG-6 cocoamide), oleic diethanolamide, or mixtures thereof. Additional suitable nonionic surfactants include polyalkoxylated aliphatic base, polyalkoxylated amide, glycol esters, glycerol esters, amine oxides, phosphate esters, alcohol phosphate, fatty triglycerides, fatty triglyceride esters, alkyl ether phosphate, alkyl esters, alkyl phenol ethoxylate phosphate esters, alkyl polysaccharides, block copolymers, alkyl polyglucosides, or mixtures thereof.

When nonionic surfactants are included in the detergent composition concentrate, they can be included in an amount of at least about 0.1 wt. % and can be included in an amount of up to about 15 wt. %. The concentrate can include about 0.1 to 1.0 wt. %, about 0.5 wt. % to about 12 wt. % or about 2 wt. % to about 10 wt. % of the nonionic surfactant.

Amphoteric surfactants can also be used to provide desired detersive properties. Suitable amphoteric surfactants that can be used include, but are not limited to: betaines, imidazolines, and propionates. Suitable amphoteric surfactants include, but are not limited to: sultaines, amphopropionates, amphodipropionates, aminopropionates, aminodipropionates, amphoacetates, amphodiacetates, and amphohydroxypropylsulfonates.

When the detergent composition includes an amphoteric surfactant, the amphoteric surfactant can be included in an amount of about 0.1 wt % to about 15 wt %. The concentrate can include about 0.1 wt % to about 1.0 wt %, 0.5 wt % to about 12 wt % or about 2 wt % to about 10 wt % of the amphoteric surfactant.

The cleaning composition can contain a cationic surfactant component that includes a detersive amount of cationic surfactant or a mixture of cationic surfactants. Cationic co-surfactants that can be used in the cleaning composition include, but are not limited to: amines such as primary, secondary and tertiary monoamines with $C_{18}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, and a naphthylene-substituted quaternary ammonium chloride such as dimethyl-1-naphthylmethylammonium chloride.

Builders—The cleaning compositions may comprise one or more detergent builders or builder systems. When a builder is used, the subject composition will typically comprise at least about 1%, from about 5% to about 60% or even from about 10% to about 40% builder by weight of the subject composition. The detergent may contain an inorganic or organic detergent builder which counteracts the effects of calcium, or other ion, water hardness. Examples include the alkali metal citrates, succinates, malonates, carboxymethyl succinates, carboxylates, polycarboxylates and polyacetyl carboxylate; or sodium, potassium and lithium salts of oxydisuccinic acid, mellitic acid, benzene polycarboxylic acids, and citric acid; or citric acid and citrate salts. Organic phosphonate type sequestering agents such as DEQUEST® by Monsanto and alkanehydroxy phosphonates are useful. Other organic builders include higher molecular weight polymers and copolymers, e.g., polyacrylic acid, polymaleic acid, and polyacrylic/polymaleic acid copolymers and their salts, such as SOKALAN® by BASF. Generally, the builder may be up to 30%, or from about 1% to about 20%, or from about 3% to about 10%.

The compositions may also contain from about 0.01% to about 10%, or from about 2% to about 7%, or from about 3% to about 5% of a $C_{8-20}$ fatty acid as a builder. The fatty acid can also contain from about 1 to about 10 EO units. Suitable fatty acids are saturated and/or unsaturated and can be obtained from natural sources such a plant or animal esters (e.g., palm kernel oil, palm oil, coconut oil, babassu oil, safflower oil, tall oil, tallow and fish oils, grease, and mixtures thereof), or synthetically prepared (e.g., via the oxidation of petroleum or by hydrogenation of carbon monoxide via the Fisher Tropsch process). Useful fatty acids are saturated $C_{12}$ fatty acid, saturated $C_{12-14}$ fatty acids, saturated or unsaturated $C_{12-18}$ fatty acids, and a mixture thereof. Examples of suitable saturated fatty acids include captic, lauric, myristic, palmitic, stearic, arachidic and behenic acid. Suitable unsaturated fatty acids include: palmitoleic, oleic, linoleic, linolenic and ricinoleic acid.

Chelating Agents—The cleaning compositions herein may contain a chelating agent. Suitable chelating agents include copper, iron and/or manganese chelating agents and mixtures thereof. When a chelating agent is used, the subject composition may comprise from about 0.005% to about 15% or even from about 3.0% to about 10% chelating agent by weight of the subject composition.

Dye Transfer Inhibiting Agents—The cleaning compositions may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in a subject composition, the dye transfer inhibiting agents may be present at levels from about 0.0001% to about 10%, from about 0.01% to about 5% or even from about 0.1% to about 3% by weight of the composition.

Optical Brighteners—In some embodiments, an optical brightener component, may be present in the compositions. The optical brightener can include any brightener that is capable of eliminating graying and yellowing of fabrics. Typically, these substances attach to the fibers and bring about a brightening and simulated bleaching action by converting invisible ultraviolet radiation into visible longer-wave length light, the ultraviolet light absorbed from sunlight being irradiated as a pale bluish fluorescence and, together with the yellow shade of the grayed or yellowed laundry, producing pure white.

Fluorescent compounds belonging to the optical brightener family are typically aromatic or aromatic heterocyclic materials often containing condensed ring systems. An important feature of these compounds is the presence of an uninterrupted chain of conjugated double bonds associated with an aromatic ring. The number of such conjugated double bonds is dependent on substituents as well as the planarity of the fluorescent part of the molecule. Most brightener compounds are derivatives of stilbene or 4,4'-diamino stilbene, biphenyl, five membered heterocycles (triazoles, oxazoles, imidazoles, etc.) or six membered heterocycles (cumarins, naphthalamides, triazines, etc.).

Optical brighteners that may be included are known and commercially available. Commercial optical brighteners which may be useful can be classified into subgroups, which include, but are not necessarily limited to, derivatives of stilbene, pyrazoline, coumarin, carboxylic acid, methinecyanines, dibenzothiophene-5,5-dioxide, azoles, 5- and 6-membered-ring heterocycles and other miscellaneous agents. Examples of these types of brighteners are disclosed in "The Production and Application of Fluorescent Brightening Agents", M. Zahradnik, Published by John Wiley & Sons, New York (1982), the disclosure of which is incorporated herein by reference.

Stilbene derivatives which may be useful include, but are not necessarily limited to, derivatives of bis(triazinyl)amino-stilbene; bisacylamino derivatives of stilbene; triazole derivatives of stilbene; oxadiazole derivatives of stilbene; oxazole derivatives of stilbene; and styryl derivatives of stilbene. In an embodiment, optical brighteners include stilbene derivatives.

In some embodiments, the optical brightener includes Tinopal UNPA, which is commercially available through the Ciba Geigy Corporation located in Switzerland.

Additional optical brighteners for use include, but are not limited to, the classes of substance of 4,4'-diamino-2,2'-stilbenedisulfonic acids (flavonic acids), 4,4'-distyrylbiphenyls, methylumbelliferones, coumarins, dihydroquinolinones, 1,3-diarylpyrazolines, naphthalimides, benzoxazol, benzisoxazol and benzimidazol systems, and pyrene derivatives substituted by heterocycles, and the like. Suitable optical brightener levels include lower levels of from about 0.01, from about 0.05, from about 0.1 or even from about 0.2 wt % to upper levels of 0.5 or even 0.75 wt %.

Alkalinity Source—In an embodiment the detergent compositions includes an alkalinity source. The source of alkalinity can be any source of alkalinity that is compatible with the other components of the detergent composition and that will provide a use solution with the desired pH. One or more alkaline sources can be used to enhance cleaning of a substrate and improve soil removal performance of the detergent composition. Examples of suitable alkalinity sources for the detergent compositions include, but are not limited to alkali metal carbonates, alkali metal hydroxides, alkali metal salts, and mixtures thereof. Exemplary alkali metal hydroxides that can be used include, but are not limited to sodium hydroxide, lithium hydroxide, or potassium hydroxide. Exemplary alkali metal carbonates that can be used include, but are not limited to: sodium or potassium carbonate, bicarbonate, sesquicarbonate, and/or mixtures thereof. Exemplary alkali metal salts include for example sodium carbonate, potassium carbonate, and mixtures thereof. In an embodiment, an alkali metal hydroxide, alkali metal carbonate and/or alkali metal salt may be added to the composition in any form known in the art, including as solid beads, dissolved in an aqueous solution, or a combination thereof. In a preferred aspect, the alkalinity source is an alkali metal hydroxide, such as sodium hydroxide. In an aspect, the detergent compositions include from about 20 wt-%-80 wt-% alkalinity, from about 30 wt-%-80 wt-% alkalinity, from about 40 wt-%-70 wt-% alkalinity, preferably from about 40 wt-%-60 wt-% alkalinity. Without being limited, all ranges recited are inclusive of the numbers defining the range and include each integer within the defined range.

Dispersants—The compositions can also contain dispersants. Suitable water-soluble organic materials include the homo- or co-polymeric acids or their salts, in which the polycarboxylic acid comprises at least two carboxyl radicals separated from each other by not more than two carbon atoms.

Enzymes—The cleaning compositions can comprise one or more enzymes which provide cleaning performance and/or fabric care benefits. Enzymes can be included herein for a wide variety of fabric laundering purposes, including removal of protein-based, carbohydrate-based, or triglyceride-based stains, for example, and/or for fabric restoration. Examples of suitable enzymes include, but are not limited to, hemicellulases, peroxidases, proteases, cellulases, xylanases, lipases, phospholipases, esterases, cutinases, pectinases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, amylases, or combinations thereof and may be of any suitable origin. The choice of enzyme(s) takes into account factors such as pH-activity, stability optima, thermostability, stability versus active detergents, chelants, builders, etc. A detersive enzyme mixture useful herein is a protease, lipase, cutinase and/or cellulase in conjunction with amylase. Sample detersive enzymes are described in U.S. Pat. No. 6,579,839.

Enzymes are normally present at up to about 5 mg, more typically from about 0.01 mg to about 3 mg by weight of active enzyme per gram of the detergent. Stated another way, the detergent herein will typically contain from about 0.001% to about 5%, or from about 0.01% to about 2%, or from about 0.05% to about 1% by weight of a commercial enzyme preparation. Protease enzymes are present at from about 0.005 to about 0.1 AU of activity per gram of detergent. Proteases useful herein include those like subtilisins from *Bacillus* [e.g. *subtilis, lentus, licheniformis, amyloliquefaciens* (BPN, BPN'), *alcalophilus*,] e.g. Esperase®, Alcalase®, Everlase® and Savinase® (Novozymes), BLAP and variants (Henkel). Further proteases are described in EP 130756, WO 91/06637, WO 95/10591 and WO 99/20726.

Amylases are described in GB U.S. Pat. No. 1,296,839, WO 94/02597 and WO 96/23873; and available as Purafect Ox Am® (Genencor), Termamyl®, Natalase®, Ban®, Fungamyl®, Duramyl® (all Novozymes), and RAPIDASE (International Bio-Synthetics, Inc).

The cellulase herein includes bacterial and/or fungal cellulases with a pH optimum between 5 and 9.5. Suitable cellulases are disclosed in U.S. Pat. No. 4,435,307 to Barbesgoard, et al., issued Mar. 6, 1984. Cellulases useful herein include bacterial or fungal cellulases, e.g. produced by Humicola insolens, particularly DSM 1800, e.g. 50 kD and ~43 kD (Carezyyme®). Additional suitable cellulases are the EGIII cellulases from Trichoderma longibrachiatum. WO 02/099091 by Novozymes describes an enzyme exhibiting endo-beta-glucanase activity (EC 3.2.1.4) endogenous to *Bacillus* sp., DSM 12648; for use in detergent and textile applications; and an anti-redeposition endo-glucanase in WO 04/053039. Kao's EP 265 832 describes alkaline cellulase K, CMCase I and CMCase II isolated from a culture product of *Bacillus* sp KSM-635. Kao further describes in EP 1 350 843 (KSM 5237; 1139; KSM 64; KSM N131), EP 265 832A (KSM 635, FERM BP 1485) and EP 0 271 044 A (KSM 534, FERM BP 1508; KSM 539, FERM BP 1509; KSM 577, FERM BP 1510; KSM 521, FERM BP 1507; KSM 580, FERM BP 1511; KSM 588, FERM BP 1513; KSM 597, FERM BP 1514; KSM 522, FERM BP 1512; KSM 3445, FERM BP 1506; KSM 425. FERM BP 1505) readily-mass producible and high activity alkaline cellulases/endo-glucanases for an alkaline environment. Such endo-glucanase may contain a polypeptide (or variant thereof) endogenous to one of the above *Bacillus* species. Other suitable cellulases are Family 44 Glycosyl Hydrolase enzymes exhibiting endo-beta-1,4-glucanase activity from Paenibacilus polyxyma (wild-type) such as XYG1006 described in WO 01/062903 or variants thereof. Carbohydrases useful herein include e.g. mannanase (see, e.g., U.S. Pat. No. 6,060,299), pectate lyase (see, e.g., WO99/27083), cyclomaltodextrin glucanotransferase (see, e.g., WO96/33267), and/or xyloglucanase (see, e.g., WO99/02663).

Bleaching enzymes useful herein with enhancers include e.g. peroxidases, laccases, oxygenases, lipoxygenase (see, e.g., WO 95/26393), and/or (non-heme) haloperoxidases.

Suitable endoglucanases include: 1) An enzyme exhibiting endo-beta-1,4-glucanase activity (E.C. 3.2.1.4), with a sequence at least 90%, or at least 94%, or at least 97% or at least 99%, or 100% identity to the amino acid sequence of positions 1-773 of SEQ ID NO:2 in WO 02/099091; or a fragment thereof that has endo-beta-1,4-glucanase activity. GAP in the GCG program determines identity using a GAP creation penalty of 3.0 and GAP extension penalty of 0.1. See WO 02/099091 by Novozymes A/S on Dec. 12, 2002, e.g., Celluclean™ by Novozymes A/S. GCG refers to sequence analysis software package (Accelrys, San Diego, Calif., USA). GCG includes a program called GAP which uses the Needleman and Wunsch algorithm to find the alignment of two complete sequences that maximizes the number of matches and minimizes the number of gaps; and 2) Alkaline endoglucanase enzymes described in EP 1 350 843A published by Kao on Oct. 8, 2003 ([0011]-[0039] and examples 1-4).

Suitable lipases include those produced by *Pseudomonas* and Chromobacter, and LIPOLASE®, LIPOLASE ULTRA®, LIPOPRIME® and LIPEX® from Novozymes. See also Japanese Patent Application 53-20487, laid open on Feb. 24, 1978, available from Areario Pharmaceutical Co. Ltd., Nagoya, Japan, under the trade name Lipase P "Amano". Other commercial lipases include Amano-CES, lipases ex Chromobacter viscosum, available from Toyo Jozo Co., Tagata, Japan; and Chromobacter viscosum lipases from U.S. Biochemical Corp., U.S.A. and Diosynth Co., The Netherlands, and lipases ex *Pseudomonas gladioli*. Also suitable are cutinases [EC 3.1150] and esterases.

Enzymes useful for liquid detergent formulations, and their incorporation into such formulations, are disclosed in U.S. Pat. No. 4,261,868 to Hora, et al., issued Apr. 14, 1981. In an embodiment, the liquid composition herein is substantially free of (i.e. contains no measurable amount of) wild-type protease enzymes. A typical combination is an enzyme cocktail that may comprise, for example, a protease and lipase in conjunction with amylase. When present in a cleaning composition, the aforementioned additional enzymes may be present at levels from about 0.00001% to about 2%, from about 0.0001% to about 1% or even from about 0.001% to about 0.5% enzyme protein by weight of the composition.

Enzyme Stabilizers—Enzymes for use in detergents can be stabilized by various techniques. The enzymes employed herein can be stabilized by the presence of water-soluble sources of calcium and/or magnesium ions in the finished compositions that provide such ions to the enzymes. In case of aqueous compositions comprising protease, a reversible protease inhibitor, such as a boron compound, can be added to further improve stability.

A useful enzyme stabilizer system is a calcium and/or magnesium compound, boron compounds and substituted boric acids, aromatic borate esters, peptides and peptide derivatives, polyols, low molecular weight carboxylates, relatively hydrophobic organic compounds [e.g. certain esters, diakyl glycol ethers, alcohols or alcohol alkoxylates], alkyl ether carboxylate in addition to a calcium ion source, benzamidine hypochlorite, lower aliphatic alcohols and carboxylic acids, N,N-bis(carboxymethyl) serine salts; (meth) acrylic acid-(meth)acrylic acid ester copolymer and PEG; lignin compound, polyimide oligomer, glycolic acid or its salts; poly hexa methylene bi guanide or N,N-bis-3-amino-propyl-dodecyl amine or salt; and mixtures thereof. The detergent may contain a reversible protease inhibitor e.g., peptide or protein type, or a modified subtilisin inhibitor of family VI and the plasminostrepin; leupeptin, peptide trifluoromethyl ketone, or a peptide aldehyde. Enzyme stabilizers are present from about 1 to about 30, or from about 2 to about 20, or from about 5 to about 15, or from about 8 to about 12, millimoles of stabilizer ions per liter.

Catalytic Metal Complexes—Applicants' cleaning compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra(methylenephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936; 5,595,967. Such cobalt catalysts are readily prepared by known procedures, such as taught for example in U.S. Pat. Nos. 5,597,936, and 5,595,967.

Compositions herein may also suitably include a transition metal complex of ligands such as bispidones (WO 05/042532 A1) and/or macropolycyclic rigid ligands—abbreviated as "MRLs". As a practical matter, and not by way of limitation, the compositions and processes herein can be adjusted to provide on the order of at least one part per hundred million of the active MRL species in the aqueous washing medium, and will typically provide from about 0.005 ppm to about 25 ppm, from about 0.05 ppm to about 10 ppm, or even from about 0.1 ppm to about 5 ppm, of the MRL in the wash liquor.

Suitable transition-metals in the instant transition-metal bleach catalyst include, for example, manganese, iron and chromium. Suitable MRLs include 5,12-diethyl-1,5,8,12-tetraazabicyclo [6.6.2]hexadecane.

Suitable transition metal MRLs are readily prepared by known procedures, such as taught for example in WO 00/32601, and U.S. Pat. No. 6,225,464.

Solvents—Suitable solvents include water and other solvents such as lipophilic fluids. Examples of suitable lipophilic fluids include siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, other environmentally-friendly solvents and mixtures thereof. In some embodiments, the solvent includes water. The water can include water from any source including deionized water, tap water, softened water, and combinations thereof. Solvents are typically present at from about 0.1% to about 50%, or from about 0.5% to about 35%, or from about 1% to about 15% by weight.

Form of the Compositions

The detergent compositions may be of any suitable form, including paste, liquid, solid (such as tablets, powder/granules), foam or gel, with powders and tablets being preferred. The composition may be in the form of a unit dose product, i.e. a form which is designed to be used as a single portion of detergent composition in a washing operation. Of course, one or more of such single portions may be used in a cleaning operation.

Solid forms include, for example, in the form of a tablet, rod, ball or lozenge. The composition may be a particulate form, loose or pressed to shape or may be formed by injection moulding or by casting or by extrusion. The composition may be encased in a water soluble wrapping, for, example of PVOH or a cellulosic material. The solid product may be provided as a portioned product as desired.

The composition may also be in paste, gel or liquid form, including unit dose (portioned products) products. Examples include a paste, gel or liquid product at least partially surrounded by, and preferably substantially enclosed in a water-soluble coating, such as a polyvinyl alcohol package. This package may for instance take the form of a capsule, a pouch or a moulded casing (such as an injection moulded casing) etc. Preferably the composition is substantially surrounded by such a package, most preferably totally surrounded by such a package. Any such package may contain one or more product formats as referred to herein and the package may contain one or more compartments as desired, for example two, three or four compartments.

If the composition is a foam, a liquid or a gel it is preferably an aqueous composition although any suitable solvent may be used. According to an embodiment the composition is in the form of a tablet, most especially a tablet made from compressed particulate material.

If the compositions are in the form of a viscous liquid or gel they preferably have a viscosity of at least 50 mPas when measured with a Brookfield RV Viscometer at 25° C. with Spindle 1 at 30 rpm.

The compositions will typically be used by placing them in a detergent dispenser e.g. in a dishwasher machine draw or free standing dispensing device in an automatic dishwashing machine, laundry machine etc. However, if the composition is in the form of a foam, liquid or gel then it may be applied to by any additional suitable means into the dishwashing machine, for example by a trigger spray, squeeze bottle or an aerosol.

Processes of Making Cleaning Compositions

The compositions may be made by any suitable method depending upon their format. Suitable manufacturing methods for detergent compositions are well known in the art, non-limiting examples of which are described in U.S. Pat. Nos. 5,879,584; 5,691,297; 5,574,005; 5,569,645; 5,565,422; 5,516,448; 5,489,392; and 5,486,303. Various techniques for forming detergent compositions in solid forms are also well known in the art, for example, detergent tablets may be made by compacting granular/particular material and may be used herein.

In one aspect, the liquid detergent compositions disclosed herein may be prepared by combining the components thereof in any convenient order and by mixing, e.g., agitating, the resulting component combination to form a phase stable liquid detergent composition. In one aspect, a liquid matrix is formed containing at least a major proportion, or even substantially all, of the liquid components, with the liquid components being thoroughly admixed by imparting shear agitation to this liquid combination. For example, rapid stirring with a mechanical stirrer may usefully be employed. While shear agitation is maintained, substantially all of any anionic surfactant and the solid ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills are incorporated. As a variation of the composition preparation procedure described above, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

Solid formulations may be made advantageously by pressing the solid composition. Specifically, in a forming process, the liquid and solid components are introduced into the final mixing system and are continuously mixed until the components form a substantially homogeneous semi-solid mixture in which the components are distributed throughout its mass. In an exemplary embodiment, the components are mixed in the mixing system for at least approximately 5 seconds. The mixture is then discharged from the mixing system into, or through, a die, press or other shaping means. The product is then packaged. In an exemplary embodiment, the solid formed composition begins to harden between approximately 1 minute and approximately 3 hours. Particularly, the formed composition begins to harden in between approximately 1 minute and approximately 2 hours. More particularly, the formed composition begins to harden in between approximately 1 minute and approximately 20 minutes.

In yet another embodiment, a single- or twin-screw extruder may be used to combine and mix one or more components agents at high shear to form a homogeneous mixture. In some embodiments, the processing temperature is at or below the melting temperature of the components. The processed mixture may be dispensed from the mixer by pressing, forming, extruding or other suitable means, whereupon the composition hardens to a solid form. The structure of the matrix may be characterized according to its hardness, melting point, material distribution, crystal structure, and other like properties according to known methods in the art. Generally, a solid composition processed is substantially homogeneous with regard to the distribution of ingredients throughout its mass and is dimensionally stable.

The present disclosure is more particularly described in the following examples that are intended as illustrations only, since numerous modifications and variations within the scope of the present embodiments will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques. All references cited herein are hereby incorporated in their entirety by reference.

EXAMPLES

Example 1: Optimized Guerbet C10 Extended Surfactants

Tables 1 and 2 summarize the structures of the series of optimized Guerbet C10 extended surfactants, their cloud points, and the range of temperatures they can form low viscoelasticity, very flowable, single phase bi-continuous microemulsions with soybean oil.

TABLE 2

| Cloud point of Extended Guerbet alcohol alkoxylates with 8 moles PO | | | | |
|---|---|---|---|---|
| | PO mols | EO mols | 1% Cloud | F. |
| Extended AE 2 | 8 | 3 | 15.6 | 60 |
| Extended AE 3 | 8 | 6 | 47.8 | 118 |
| Extended AE 4 | 8 | 8 | 67.1 | 153 |
| Extended AE 5 | 8 | 10 | 81.1 | 178 |

TABLE 3

Microemulsion of Extended Guerbet alcohol alkoxylates with 8 moles PO

| | Exp1 | Exp2 | Exp3 | Exp4 | Exp5 | Exp6 | Exp7 | Exp8 | Exp9 | Exp10 | Exp11 | Exp12 |
|---|---|---|---|---|---|---|---|---|---|---|---|---|
| Soybean Oil | 5 | 5 | 5 | 5 | 5 | 5 | 5 | 5 | 5 | 5 | 5 | 5 |
| Water | 5 | 5 | 5 | 5 | 5 | 5 | 5 | 5 | 5 | 5 | 5 | 5 |
| Extended AE 2 | 3 | 4 | 5 | — | — | — | — | — | — | — | — | — |
| Extended AE 3 | — | — | — | 3 | 4 | 5 | — | — | — | — | — | — |
| Extended AE 4 | — | — | — | — | — | — | 3 | 4 | 5 | — | — | — |
| Extended AE 5 | — | — | — | — | — | — | — | — | — | 3 | 4 | 5 |
| Microemulsion Temp | | 90-80 | 90-80 | 160-138 | 160-120 | 160-120 | | 180-150 | 185-140 | | 190-170 | 190-165 |

Example 2: Tergometer Tests

Test procedure: a red or white napkin towel was deposited with 10 µl oil drop (olive oil, Crisco oil, and corn oil) on its surface (FIG. 1). Multiple oil drops could be put on each napkin. The samples were soaked with 1 L Di-water with various surfactant concentrations and washed at setting temperatures for 20 minutes in a tergotomer. Then the samples were rinsed with tap water at room temperature unless other conditions are indicated. A visual inspection was performed after the samples were ironed dried.

New napkin sample: new opened napkin sample without previous test.

Old napkin sample: clean napkin sample, might be tested before.

Previously tested sample: tested samples with clearly visible oil residue.

TABLE 4

Tergometer Test 1
Test Conditions: 120° F., 20 minutes, speed 96-100

| | Sample 1 | Sample 2 | Sample 3 | Sample 4 | Sample 5 | Sample 6 |
|---|---|---|---|---|---|---|
| Surfactant (Total weight 2 g) | Narrow range L24-3: L24-7 2:1 | Extended Surfactant C10PO8EO6 | Extended Surfactant C10PO8EO8 | Extended Surfactant C10PO8EO6: C10PO8EO8 1:1 | ECO-40: Pluronic 10R5 | None |
| Solution Appearance | Less cloudy, fine foam | Cloudy | Most cloudy | Cloudy | Clear | Clear |
| Rinse Procedure | Manually rinsed with grain 5 tap water at room temperature | | | | | |
| Removal Result (Oil residue spot) | Less visible | More visible | Visible | Less Visible | More visible | Most visible |

TABLE 5

| Tergometer Test 2<br>Test Conditions: 140° F., 20 minutes, speed 96-100 | | | | | | |
|---|---|---|---|---|---|---|
| | Sample 1 | Sample 2 | Sample 3 | Sample 4 | Sample 5 | Sample 6 |
| Surfactant (Total weight 2 g) | Narrow range L24-3: L24-7 2:1 | Extended Surfactant C10PO8EO6 | Extended Surfactant C10PO8EO8 | Extended Surfactant C10PO8EO6: C10PO8EO8 1:1 | Extended Surfactant C10PO8EO10 | None |
| Solution Appearance | Cloudy, foam | Most cloudy | Less cloudy | Cloudy | Less cloudy | clear |
| Rinse Procedure | Manually rinsed with grain 5 tap water at room temperature | | | | | |
| Removal Result (Oil residue spot) | Less visible, one olive residue disappeared | Less visible | Less visible | Visible | Visible | Most visible |

TABLE 6

| Tergometer Test 3<br>Test Conditions: 170° F., 20 minutes, speed 96-100 | | | | | | |
|---|---|---|---|---|---|---|
| | Sample 1 | Sample 2 | Sample 3 | Sample 4 | Sample 5 | Sample 6 |
| Surfactant (Total weight 2 g) | Narrow range L24-3: L24-7 2:1 | Extended Surfactant C10PO8EO6 | Extended Surfactant C10PO8EO8 | Extended Surfactant C10PO8EO6: C10PO8EO8 1:1 | Extended Surfactant C10PO8EO10 | Narrow range L24-7: C10PO8EO8 |
| Solution Appearance | Less cloudy | Less cloudy | Less cloudy | Most cloudy | Cloudy | Cloudy |
| Rinse Procedure | Manually rinsed with grain 5 tap water at room temperature | | | | | |
| Removal Result (Oil residue spot) | Visible | No residue | Less Visible | No residue | Visible | Less Visible |

TABLE 7

| Tergometer Test 4<br>Test Conditions: 155° F., 20 minutes, speed 96-100 | | | | | | |
|---|---|---|---|---|---|---|
| | Sample 1 | Sample 2 | Sample 3 | Sample 4 | Sample 5 | Sample 6 |
| Surfactant (Total weight 2 g) | Narrow range L24-3: L24-7 2:1 | Extended Surfactant C10PO8EO6 | Extended Surfactant C10PO8EO8 | Extended Surfactant C10PO8EO6: C10PO8EO8 1:1 | Extended Surfactant C10PO8EO3 | Extended Surfactant C10PO8EO6: C10PO8EO3 1:1 |
| Solution Appearance | Less cloudy | Most cloudy | Less cloudy | Most cloudy | cloudy | Most cloudy |
| Rinse Procedure | Manually rinsed with grain 5 tap water at room temperature | | | | | |
| Removal Result (Oil residue spot) | Visible | Visible | Visible | Visible | Reverse residue area | Visible |

Reverse residue area: oil part has lighter color with less water spreadability compared with non-oil surface.

TABLE 8

| Tergometer Test 5<br>Test Conditions: 170° F., 20 minutes, speed 96-100 | | | | | | |
|---|---|---|---|---|---|---|
| | Sample 1 | Sample 2 | Sample 3 | Sample 4 | Sample 5 | Sample 6 |
| Surfactant (Total weight 2 g) | Narrow range L24-7: Extended C10PO8EO3 1:1 | Extended C10PO8EO3 + 0.1 g Acumer 1000 | Extended C10PO8EO6 | Extended C10PO8EO6: C10PO8EO8 1:1 | Extended C10PO8EO3 | Narrow range L24-7: Extended C10PO8EO6 1:1 |
| | New napkin samples used | | | | | |
| Solution Appearance | Cloudy | Less cloudy | Less cloudy | Most cloudy | Less cloudy | Less cloudy |
| Rinse Procedure | Manually rinsed with grain 5 tap water at room temperature | | | | | |
| Removal Result (Oil residue spot) | Visible | Reverse residue sign | Visible | Visible | Reverse residue area | Visible |

ACUMER 1000 is a low molecular weight polyacrylate with a selected molecular weight around 2000.

The extended surfactant C10$(PO)_8(EO)_n$(n=3,6,8,10) has a higher removal efficiency than the mixture of narrow range L24-7 and L24-3 (Linear Alcohol Ethoxylate,7 Mol Ethoxylated C 12-14 Linear Alcohol)) under the same conditions.

Tests 3 and 5 showed that under exactly the same conditions, the oil residue was more difficult to be removed from the new napkin surface. The new napkin sample felt more rigid than the used one.

TABLE 9

| Tergometer Test 6<br>Test Conditions: 170° F., 20 minutes, speed 96-100 | | | | | | |
|---|---|---|---|---|---|---|
| | Sample 1 | Sample 2 | Sample 3 | Sample 4 | Sample 5 | Sample 6 |
| Surfactant (Total weight 2 g) | Extended C10PO8EO3 | Extended C10PO8EO6 | Extended C10PO8EO6: C10PO8EO3 1:1 | Extended C10PO8EO3 | Extended C10PO8EO6 | PEG40: Pluronic 10R5 |
| Note | No oil pre-spot on napkin surface, new napkin sample | new napkin sample | | | Pre-soak at 180° F. for 15 minutes napkin sample | |
| Solution Appearance | N/A | N/A | N/A | N/A | N/A | N/A |
| Rinse Procedure | Manually rinsed with grain 5 tap water at room temperature | | | | | |
| Removal Result (Oil residue spot) | Most surface appeared dark | Less visible | Reverse residue sign | Reverse residue sign | All Crisco drops visible, removed 3 corn oil and 1 olive drops | Most visible |

TABLE 10

| Tergometer Test 7<br>Test Conditions: 170° F., 20 minutes, speed 96-100 | | | | | | |
|---|---|---|---|---|---|---|
| | Sample 1 | Sample 2 | Sample 3 | Sample 4 | Sample 5 | Sample 6 |
| Surfactant (Total weight 2 g) | Extended C10PO8EO6 | Extended C10PO8EO6 | Extended C10PO8EO6 | Extended C10PO8EO6 | Extended C10PO8EO6: Tomanine DA-17 3:1 | none |

TABLE 10-continued

| Tergometer Test 7<br>Test Conditions: 170° F., 20 minutes, speed 96-100 | | | | | | |
|---|---|---|---|---|---|---|
| | Sample 1 | Sample 2 | Sample 3 | Sample 4 | Sample 5 | Sample 6 |
| Note | Previously tested samples | | | | | |
| Solution Appearance | N/A | N/A | N/A | N/A | N/A | N/A |
| Rinse Procedure | Manually rinsed with grain 5 tap water at room temperature | | | | | |
| Removal Result (Oil residue spot) | No residue | No residue | No residue | No residue | Less visible | Visible |

TABLE 11

| Tergometer Test 8<br>Test Conditions: 170° F., 20 minutes, speed 96-100 | | | | | | |
|---|---|---|---|---|---|---|
| | Sample 1 | Sample 2 | Sample 3 | Sample 4 | Sample 5 | Sample 6 |
| Surfactant (Total weight 2 g) | Extended C10PO8EO6 | Extended C10PO8EO6 | Extended C10PO8EO6 | Extended C10PO8EO6 | Extended C10PO8EO6 | Extended C10PO8EO6 |
| Note | Pre-soak at 180° F. for 15 minutes napkin sample | new napkin sample | Old napkin sample | Pre-soak at 180° F. for 15 minutes napkin sample | new napkin sample | Old napkin sample |
| Solution Appearance | N/A | N/A | N/A | N/A | N/A | N/A |
| Rinse Procedure | Manually rinsed with grain 5 tap water at room temperature | | | | | |
| Removal Result (Oil residue spot) | Visible | Visible | No residue | Visible | Visible | No residue |

TABLE 12

| Tergometer Test 9<br>Test Conditions: 140° F., 20 minutes, speed 96-100. | | | | | | |
|---|---|---|---|---|---|---|
| | Sample 1 | Sample 2 | Sample 3 | Sample 4 | Sample 5 | Sample 6 |
| Surfactant (Total weight 2 g) | Extended C10PO8EO3: DA-17 3:2 | Extended C10PO8EO3: DA-17 3:2 | Extended C10PO8EO3: DA-17 3:2 | Extended C10PO8EO3: DA-17 3:2 | Extended C10PO8EO3: DA-17 3:2 | Extended C10PO8EO3: DA-17 3:2 |
| Note | Pre-soak at 180° F. for 15 minutes napkin sample with 0 grain water | new napkin sample with 0 grain water | new napkin sample with 17 grain water | old napkin sample with 0 grain water | old napkin sample with 17 grain water | old napkin sample with 5 grain water |
| Solution Appearance | N/A | N/A | N/A | N/A | N/A | N/A |
| Rinse Procedure | Manually rinsed with grain 5 tap water at room temperature | | | | | |

In test 9, most oil residues were invisible or very light. However, for some samples re-rinsed with ice-cold water, the normal oil residue spots re-appeared.

TABLE 13

| Tergometer Test 10<br>Test Conditions: 80° F., 20 minutes, speed 96-100 | | | | | |
|---|---|---|---|---|---|
| | Sample 1 | Sample 2 | Sample 3 | Sample 4 | Sample 5 |
| Surfactant (Total weight 2 g) | Extended C10PO8EO3 | Extended C10PO8EO3: Lutensol TO3 1:1 | Extended C10PO8EO3: DA-17 1:1 | Extended C10PO8EO3: SLES | None |
| Note | Two previously tested napkin samples | | | | |
| Solution Appearance | Cloudy | Less cloudy | Less cloudy | Cloudy | Small Foam |
| Rinse Procedure | Manually rinsed with grain 5 tap water at room temperature | | | | |
| Removal Result (Oil residue spot) | One sample showed reverse residue, one sample with dark surface | One sample with dark surface, one sample with some oil residue | Two samples with visible residue | Two samples with visible residue | Two samples with visible residue |

TABLE 14

| Tergometer Test 11<br>Test Conditions: 80° F., 20 minutes, speed 96-100 | | | | | | |
|---|---|---|---|---|---|---|
| | Sample 1 | Sample 2 | Sample 3 | Sample 4 | Sample 5 | Sample 6 |
| Surfactant | Tergitol 15-S-7 Extended C10PO8EO3 2 gram | Extended C10PO8EO3 1 gram | Extended C10PO8EO3 0.5 gram | Extended C10PO8EO3: PEG400 1:1 2 gram | Extended C10PO8EO3: SLES 1:1 2 gram | Extended C10PO8EO3: Tergital 15-S-7 1:1 2 gram |
| Note | One previously tested napkin sample and one white napkin sample deposited with dyed olive oil | | | | | |
| Solution Appearance | Cloudy | Most cloudy | Cloudy | Cloudy | Less cloudy | Cloudy |
| Rinse Procedure | Manually rinsed with grain 5 tap water at room temperature | | | | | |
| Removal Result (Oil residue spot) | White napkin: tiny red spots around the original residue indicating reposition of oil on surface. Red napkin: dark surface | White napkin: Visible. Red napkin: less visible, closed to sample 6. | White napkin: Visible. Red napkin: dark surface. | White napkin: less Visible. Red napkin: less dark surface. | White napkin: less Visible. Red napkin: visible oil residue | White napkin: lest visible. Red napkin: dark surface |

TABLE 15

| Tergometer Test 12<br>Test Conditions: 80° F., 20 minutes, speed 96-100 | | | | | | |
|---|---|---|---|---|---|---|
| | Sample 1 | Sample 2 | Sample 3 | Sample 4 | Sample 5 | Sample 6 |
| Surfactant (Total weight 2 g) | Tergitol 15-S-7 | Extended C10PO8EO3: Tergitol 15-S-7 1:3 | Extended C10PO8EO3: Tergitol 15-S-7 1:1 | Extended C10PO8EO3: Tergitol 15-S-7 3:1 | Tergitol 15-S-7 1 gram | Extended C10PO8EO3: PEG400 3:1 |
| Note | One previously tested napkin samples | | | | | |
| Solution Appearance | Less cloudy | Cloudy | Cloudy | Cloudy | Less cloudy | Most cloudy |
| Rinse Procedure | Manually rinsed with grain 5 tap water at room temperature | | | | | |
| Removal Result (Oil residue spot) | Visible | Visible | Less Visible | Visible | Visible | Dark surface |

Tergitol 15-S-7 is a secondary alcohol ethoxylate

TABLE 16

| Tergometer Test 13<br>Test Conditions: 87 F., 20 minutes, speed 96-100 | | | | | |
|---|---|---|---|---|---|
| | Sample 1 | Sample 2 | Sample 3 | Sample 4 | Sample 5 |
| Surfactant | Extended C10PO8EO3: PEG400 1:1 2 gram | Extended C10PO8EO3: Acusol 505N 1:3 4 gram | Extended C10PO8EO3: Acusol 505N 1:1 2 gram | Extended C10PO8EO3: Acrylic acid (RM#251091) 1:1 2 gram | Extended C10PO8EO3: glycol ether 1:1 2 gram |
| Solution Appearance | Less cloudy | Cloudy | Cloudy | Less cloudy | Cloudy |
| Rinse Procedure | Manually rinsed with grain 5 tap water at room temperature | | | | |
| Removal Result (Oil residue spot) | Dark surface | Visible | Visible | Dark surface | Dark surface |

TABLE 17

| Tergometer Test 14<br>Test Conditions: 140° F., 20 minutes, speed 96-100 | | | | | |
|---|---|---|---|---|---|
| | Sample 1 | Sample 2 | Sample 3 | Sample 4 | Sample 5 |
| Surfactant (Total weight 2 g) | Extended C10PO8EO3: PEG400 1:1 | Extended C10PO8EO3: Acusol 505N 1:1 | Extended C10PO8EO3: DA-17: PEG400 1:0.5:0.5 | Extended C10PO8EO3: DA-17: Acusol 505N 1:0.5:1 | Extended C10PO8EO3: DA17 1:1 |
| Solution Appearance | Cloudy | Most Cloudy | Less cloudy | White participation at start | Cloudy |
| Rinse Procedure | Manually rinsed with grain 5 tap water at room temperature | | | | |
| Removal Result (Oil residue spot) | Reverse residue | Visible | Slight reverse residue | Reverse residue | Visible |

Accusol 550N is an acrylic-maleic acid copolymer

TABLE 18

| Tergometer Test 15<br>Test Conditions: 120° F., 20 minutes, speed 96-100. | | | | | | |
|---|---|---|---|---|---|---|
| | Sample 1 | Sample 2 | Sample 3 | Sample 4 | Sample 5 | Sample 6 |
| Surfactant (Total weight 2 g) | Extended C10PO8EO3: PEG400 1:1 | Extended C10PO8EO3: PEG400 0.7:1.3 | Extended C10PO8EO3: DA-17: PEG400 0.8:0.4:0.8 | Extended C10PO8EO3: DA-17 1:1 | Lutensol TO3: PEG 400 1:1 | Lutensol TO3: DA-17 1:1 |
| Solution Appearance | N/A | N/A | N/A | N/A | N/A | N/A |
| Rinse Procedure | Manually rinsed with grain 5 tap water at room temperature | | | | | |
| Removal Result (Oil residue spot) | Reverse residue | Reverse corn oil area, other part dark | Slight dark surface | Dark surface | Dark surface | Dark surface |

Lutensol ® TO 3 is a nonionic surfactant, based on a saturated iso-C13-alcohol.

Tomaminie Da-17 is a Ether diamine surfactant

TABLE 19

| Tergometer Test 16<br>Test Conditions: ice-cold water, 20 minutes, speed 96-100 | | | | | | |
|---|---|---|---|---|---|---|
| | Sample 1 | Sample 2 | Sample 3 | Sample 4 | Sample 5 | Sample 6 |
| Surfactant | Extended C10PO8EO3 2 gram | Extended C10PO8EO3 1 gram | Extended C10PO8EO3 0.5 gram | Extended C10PO8EO3: PEG 400 1:1 2 gram | Extended C10PO8EO3 2 gram | Extended C10PO8EO3 0.5 gram |
| Note | previously tested napkin samples | | | | New deposited samples | |
| Rinse Procedure | Manually rinsed with ice-cold water | | | | | |
| Removal Result (Oil residue spot) | Light visible residue with bright surrounding area | No residue, dark surface | Visible residue | Less visible residue | Less visible residue | Most visible residue with bright surrounding area |

TABLE 20

| Tergometer Test 17<br>Test Conditions: 170° F., 20 minutes, speed 96-100 | | | | | | |
|---|---|---|---|---|---|---|
| | Sample 1 | Sample 2 | Sample 3 | Sample 4 | Sample 5 | Sample 6 |
| Surfactant (Total weight 2 g) | X-AES: DA-17 1:1 | Extended C10PO8EO3: DA-17 1:1 | Extended C10PO8EO3: PEG 400 1:1 | First Extended C10PO8EO3 1 gram: 10 minutes later: PEG 400 1 gram | Lutensol TO3: PEG 400 1:1 | Extended C10PO8EO6: DA-17 3:2 |
| Solution Appearance | Most cloudy | Less cloudy | Less cloudy | Cloudy | Less cloudy | Cloudy |
| Rinse Procedure | Manually rinsed with ice-cold water | | | | | |
| Removal Result (Oil residue spot) | Most visible | Visible | Visible | Visible | Visible | No residue, also removed ball-pen marker |

TABLE 21

| Tergometer Test 18<br>Test Conditions: 110° F., 20 minutes, speed 96-100 | | | | | | |
|---|---|---|---|---|---|---|
| | Sample 1 | Sample 2 | Sample 3 | Sample 4 | Sample 5 | Sample 6 |
| Surfactant | Extended C10PO8EO3 1 gram | Extended C10PO8EO3: C10PO8EO6 1 gram: 0.4 gram | Extended C10PO8EO3 1 gram | Extended C10PO8EO3: Tween 20 1 gram: 1 gram | Extended C10PO8EO3: C10PO8EO6 1 gram: 0.3 gram | Extended C10PO8EO6 1 gram |
| Solution Appearance | NA | | | | | |
| Rinse Procedure | 110° F. water | 110° F. water | 110° F. Tween 20 1 gram | 110° F. water | 110° F. water | 110° F. Tween 80 1 gram |
| Removal Result (Oil residue spot) | Dark surface | Dark surface | Reverse residue | Visible | Reverse residue | Reverse residue |

TABLE 22

| Tergometer Test 19 Test Condition: 120° F., 20 minutes, speed 96-100. | | | | | | |
|---|---|---|---|---|---|---|
| | Sample 1 | Sample 2 | Sample 3 | Sample 4 | Sample 5 | Sample 6 |
| Surfactant | Extended C10PO8EO3: Pluronic N3 1 gram: 0.1 gram | Extended C10PO8EO3: C10PO8EO10 1.1 gram: 0.4 gram | X-AES: DA-17 4.3 gram: 1 gram | Extended C10PO8EO3 at pH 9 | Extended C10PO8EO3: 1 gram | Extended C10PO8EO6: Pluronic N3 1.1 gram: 0.2 gram |
| Solution Appearance | NA | | | | | |
| Rinse Procedure | Rinse at 120° F. 10 minutes | | | | | |
| Removal Result (Oil residue spot) | Light surface | Light surface | Dark surface | Medium dark surface | Medium dark surface | Medium dark surface |
| Re-rinse | Ice-cold water | | | | | |
| Removal Result (Oil residue spot) | Slight reverse residue | No residue | Reverse residue | Reverse residue | Most reverse residue | No residue |

Pluronic N3 is an ethylene oxide/propylene block copolymer

TABLE 23

| Tergometer Test 20 Test Conditions: 120° F., 20 minutes, speed 96-100 | | | | | | |
|---|---|---|---|---|---|---|
| | Sample 1 | Sample 2 | Sample 3 | Sample 4 | Sample 5 | Sample 6 |
| Surfactant | Extended C10PO8EO3: Pluronic 10R5 1 gram: 0.2 gram | Extended C10PO8EO3: Pluronic N3 1 gram: 0.2 gram | Extended C10PO8EO3: Pluronic 25R2 1 gram: 0.2 gram | Extended C10PO8EO3: C10PO8EO10 0.8 gram: 0.4 gram | Extended C10PO8EO3: Pluronic 25R4 1 gram: 0.2 gram | Extended C10PO8EO3: C10PO8EO10 0.6 gram: 0.6 gram |
| Note | Old napkin samples | | | | | |
| Rinse Procedure | 5 grain water 120° F. 10 minutes | | | | | |
| Removal Result (Oil residue spot) | No residue | No residue | Light visible residue | Light visible residue | No residue | Light visible residue |
| Re-rinse | Cold-water rinse | | | | | |
| Removal Result | Similar with 120° F. except the whole napkin surface slightly turned bright | | | | | |

Pluronic 10R5 is a Poly(propylene glycol)-block-poly(ethylene glycol)-block-poly(propylene glycol)
Pluronic 25R4 and !5R2 are difunctional block copolymer surfactants with terminal secondary hydroxyl groups

TABLE 24

| Tergometer Test 21 Test Conditions: 120° F., 20 minutes, speed 96-100. | | | | | | |
|---|---|---|---|---|---|---|
| | Sample 1 | Sample 2 | Sample 3 | Sample 4 | Sample 5 | Sample 6 |
| Surfactant | Extended C10PO8EO3: C10PO8EO10 0.8 gram: 0.4 gram | Extended C10PO8EO3: C10PO8EO10 0.7 gram: 0.5 gram | Extended C10PO8EO3 1.2 gram | Extended C10PO8EO10 1.2 gram | Extended C10PO8EO3: Pluronic 25R4 1 gram: 0.2 gram | Extended C10PO8EO3: Pluronic N3 1 gram: 0.2 gram |
| Note | New napkin samples (compared with Test 20) | | | | | |
| Rinse Procedure | 5 grain water 120° F. 10 minutes | | | | | |
| Removal Result (Oil residue spot) | Visible | Visible | Dark surface | Visible | Dark surface | Dark surface |

TABLE 24-continued

| Tergometer Test 21<br>Test Conditions: 120° F., 20 minutes, speed 96-100. | | | | | | |
|---|---|---|---|---|---|---|
| | Sample 1 | Sample 2 | Sample 3 | Sample 4 | Sample 5 | Sample 6 |
| Re-rinse | Cold-water rinse | | | | | |
| Removal Result | Visible | Visible | Visible | Visible | No residue, light surface | No residue, light surface |

Figure 3:
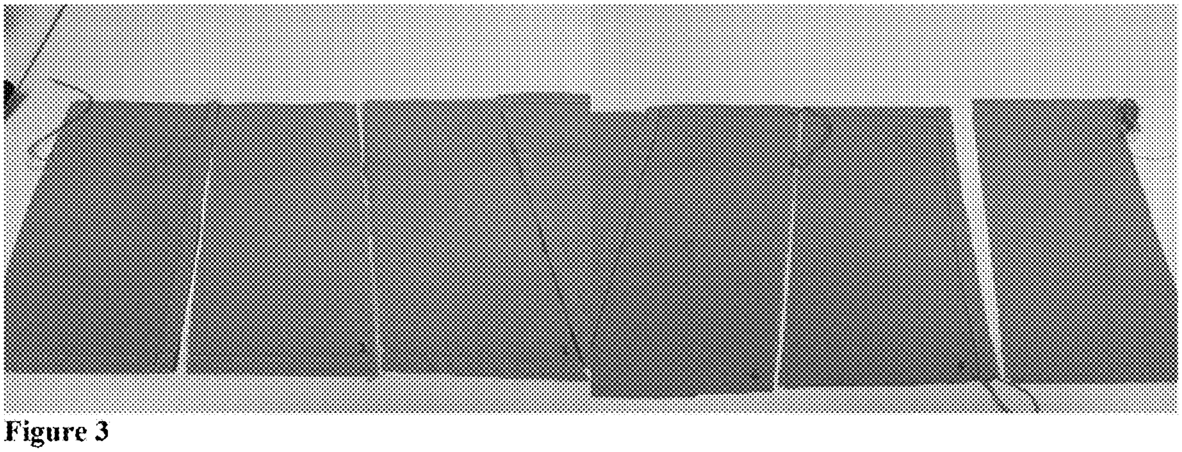
FIG. 3 shows the results of test 20 (Table 23) with old napkin samples. Photos were taken after cold-water rinse.
Figure 4:
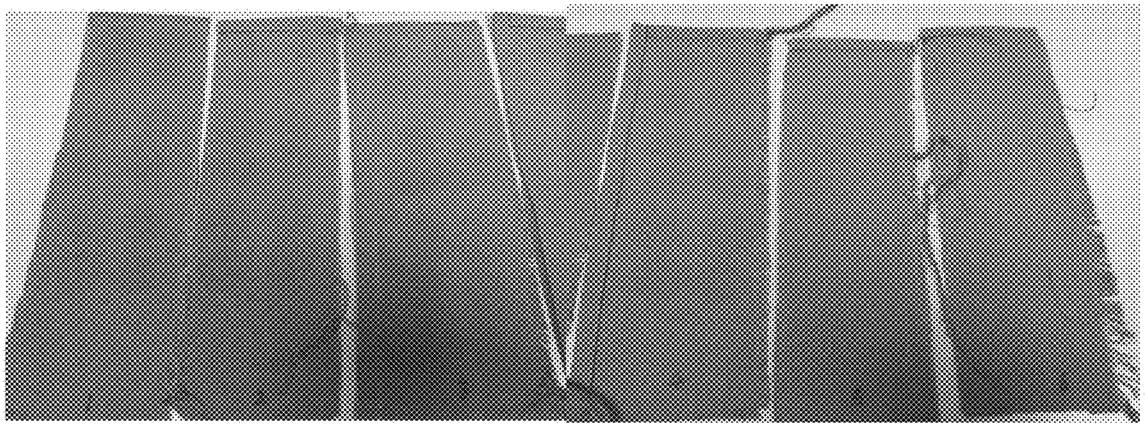
FIG. 4 shows test results of test 21 (Table 24) with old napkin samples. Photos were taken after cold-water rinse.
Figure 5:
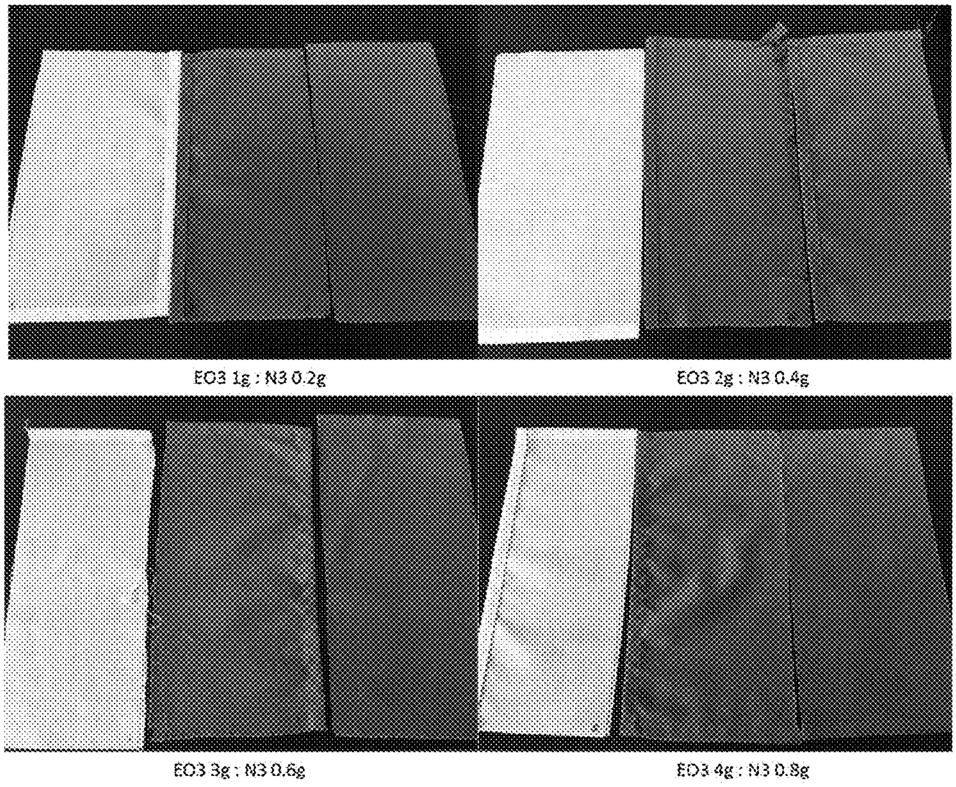
FIG. 5 shows the results of a high temperature rinse.
Figure 6:
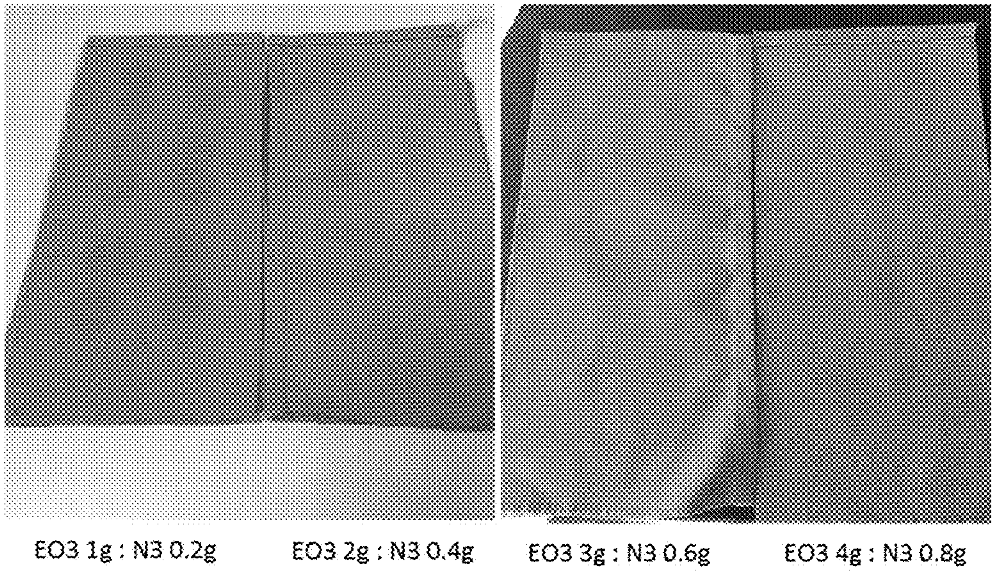
FIG. 6 shows the results of a low temperature rinse for new napkins.
Figure 7:
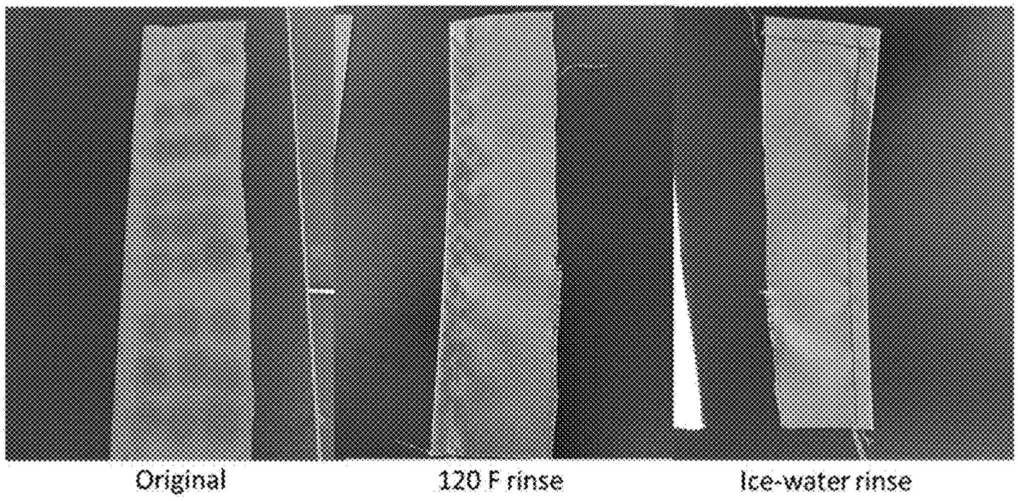
FIG. 7 shows the results with new napkins after a 120° F. rinse or an ice-water rinse.

Tests 20 (FIGS. 3) and 21 (FIG. 4) show that under exactly the same conditions, the oil residue was more difficult to be removed from the new napkin surface. Also, extended surfactant C10PO8EO3 mixed with pluronic N3 or 25R4 (one component within N3) had a better result than C10PO8EO3 alone.

TABLE 25

| Tergometer Test 22<br>Test Conditions: 120° F., 20 minutes, speed 96-100 | | | | | | |
|---|---|---|---|---|---|---|
| | Sample 1 | Sample 2 | Sample 3 | Sample 4 | Sample 5 | Sample 6 |
| Surfactant | Pluronic N3 1.2 gram | Extended C10PO8EO3: Pluronic N3 1 gram: 0.2 gram | Extended C10PO8EO3: Pluronic 25R4 1 gram: 0.2 gram | Extended C10PO8EO3 1.2 gram | Extended C10PO8EO3: Pluronic N3 1 gram: 0.2 gram | Extended C10PO8EO3: Pluronic N3 1 gram: 0.2 gram |
| Note | One new napkin and one old napkin sample | | | | Previously tested sample | White napkin sample |
| Rinse Procedure | 5 grain water 120° F. 10 minutes | | | | | |
| Removal Result (Oil residue spot) | Visible residue on both napkin samples | Dark surface of new napkin and reverse residue on old napkin | Dark surface of new napkin and reverse residue on old napkin | Slight visible residue on new napkin, reverse residue on old napkin | No residue | No residue |
| Re-rinse | Ice-cold water rinse | | | | | |
| Removal Result | Visible residue on both napkin samples | Visible residue on new napkin and no residue on old napkin | Visible residue on new napkin and no residue on old napkin | Visible residue on new napkin and no residue on old napkin | No residue, light surface | No residue, light surface |

TABLE 26

| Tergometer Test 23<br>Test Conditions: 120° F., 20 minutes, speed 96-100 | | | | | | |
|---|---|---|---|---|---|---|
| | Sample 1 | Sample 2 | Sample 3 | Sample 4 | Sample 5 | Sample 6 |
| Surfactant | Extended C10PO8EO3: Pluronic N3 1 gram: 0.2 gram | Extended C10PO8EO3: Pluronic N3 1 gram: 0.2 gram | Extended C10PO8EO3: Pluronic N3 2 gram: 0.4 gram | Narrow range L24-7 1.2 gram | Narrow range L24-7: Pluronic N3 1 gram: 0.2 gram | Narrow range L24-7: Pluronic N3 0.6 gram: 0.6 gram |
| Note | One new napkin sample | Two new napkin samples | 4 old napkin samples | | | |
| Rinse Procedure | Ice-cold water | | | | | |
| Removal Result (Oil residue spot) | No residue | Light visible residue | Most residue removed, one napkin sample still has some invert residue | Visible | Visible | Visible |

TABLE 27

| Tergometer Test 24<br>Test Conditions: 120° F., 20 minutes, speed 96-100 | | | | | |
|---|---|---|---|---|---|
| | Sample 1 | Sample 2 | Sample 3 | Sample 4 | Sample 5 |
| Surfactant | Extended C10PO8EO3: Pluronic N3 1 gram: 0.2 gram | Extended C10PO8EO3: Pluronic N3 2 gram: 0.4 gram | Extended C10PO8EO3: Pluronic N3 3 gram: 0.6 gram | Extended C10PO8EO3: Pluronic N3 4 gram: 0.8 gram | Extended C10PO8EO3: Pluronic N3 1 gram: 0.2 gram |
| Note | One new napkin sample, one old napkin sample, and one white napkin sample | | | | One stripe of new napkin with extra oil drops |
| Rinse Procedure | 5 grain water 120° F. 10 minutes | | | | |
| Removal Result (Oil residue spot) | No residue on white napkin, slight, slight reverse on red napkin | No residue on white napkin, slight, slight reverse on red napkin | No residue on white napkin, slight, slight reverse on red napkin | No residue on white napkin, slight, slight reverse on red napkin | No residue |
| Re-rinse | | | Ice-cold water | | |
| Removal Result | New napkin visible, old and white napkin no residue | New napkin less visible, old and white napkin no residue | No residue | No residue | No residue |

Tests 23 and 24 showed that the cleaning results were related with total napkin loading, not just oil amount. The extended surfactant was extensively adsorbed on the napkin surface.

Example 3: Design of Experiment (DoE) of a Cosurfactant (Pluronic N3) and/or Alkali with C10PO8EO6

A 16 run, full factorial, 2 factor interaction DoE was performed (FIG. 8) with the 5 factors shown in Table 28 to simultaneously optimize both cleaning success and cost:

TABLE 28

| Factors | | | | | |
|---|---|---|---|---|---|
| Factor | Name | Units | Type | Minimum | Maximum |
| A | Temp | F. | Numeric | 120.00 | 140.00 |
| B | Time | min | Numeric | 10.00 | 20.00 |
| C | 50 wt % NaOH Alkalinity | g/L | Numeric | 0.0000 | 3.00 |
| D | C10PO8EO6 | g/L | Numeric | 0.5000 | 1.50 |
| E | Pluronic N3 | g/L | Numeric | 0.0000 | 0.3000 |

Methodology

- Cut 4"×4" Red Napkin Spun polyester sample
- 1 drop with 100 microliters Olive Oil
- Heat at 50° C. in oven for 10 min
- Wash in Tergotometer, no rinse
- Assign Visual Score (1=dirty, 2=light but still dirty, 3=clean)
- Calculate cost based on dosing of factors C, D and E in the design

| Run | Factor 1 A: Temp F. | Factor 2 B: Time min | Factor 3 C: 50 wt % Na . . . g/L | Factor 4 D: C10PO8EO6 g/L | Factor 5 E: Pluronic N3 g/L | Response 1 Visual Score |
|---|---|---|---|---|---|---|
| 1 | 120 | 20 | 0 | 0.5 | 0 | 1 |
| 2 | 140 | 10 | 0 | 1.5 | 0.3 | 3 |

-continued

| Run | Factor 1 A: Temp F. | Factor 2 B: Time min | Factor 3 C: 50 wt % Na . . . g/L | Factor 4 D: C10PO8EO6 g/L | Factor 5 E: Pluronic N3 g/L | Response 1 Visual Score |
|---|---|---|---|---|---|---|
| 3 | 140 | 20 | 0 | 1.5 | 0 | 1 |
| 4 | 140 | 20 | 0 | 0.5 | 0.3 | 3 |
| 5 | 120 | 10 | 3 | 0.5 | 0 | 1 |
| 6 | 120 | 10 | 3 | 1.5 | 0.3 | 3 |
| 7 | 120 | 20 | 0 | 1.5 | 0.3 | 2 |
| 8 | 140 | 10 | 3 | 1.5 | 0 | 2 |
| 9 | 140 | 10 | 0 | 0.5 | 0 | 1 |
| 10 | 120 | 20 | 3 | 1.5 | 0 | 2 |
| 11 | 140 | 20 | 3 | 0.5 | 0 | 3 |
| 12 | 140 | 10 | 3 | 0.5 | 0.3 | 2 |
| 13 | 120 | 20 | 3 | 0.5 | 0.3 | 3 |
| 14 | 120 | 10 | 0 | 1.5 | 0 | 1 |
| 15 | 120 | 10 | 0 | 0.5 | 0.3 | 1 |
| 16 | 140 | 20 | 3 | 1.5 | 0.3 | 3 |

Results showed a significant model with a R^2=0.89 and an adjusted R^2 =0.82. The adjusted R-squared is a modified version of R-squared that has been adjusted for the number of predictors in the model. The adjusted R-squared increases only if the new term improves the model more than would be expected by chance. It decreases when a predictor improves the model by less than expected by chance.

Both factor C (alkali) and factor E (Pluronic N3) are shown as significant additives to supplement factor D at relatively low starting concentrations and much lower operation temperatures to optimize cleaning performance and cost. Previous DoE work has shown a need for standalone surfactant concentrations needing to be between 3-5 g/L. The ratio of extended surfactant to polymer can be from about 1:1 to about 5:1. The ratio of extended surfactant to alkalinity can be from about 2:1 to about 1:6.

Example 4

Tables 29 and 30 show field testing for the standalone effect of PO8EO3 and PO8EO6 on food oil on polyester challenges without alkali at various temperatures and rinse-ability observations.

TABLE 29

Figure 10:
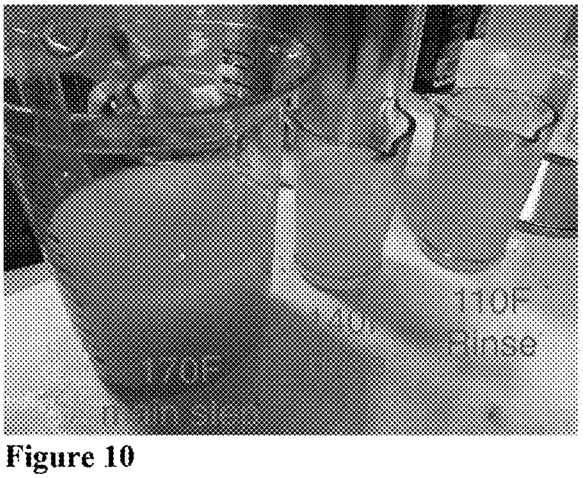
FIG. 10 shows the solution appearance for wash process 1 (Table 29)
Figure 11:
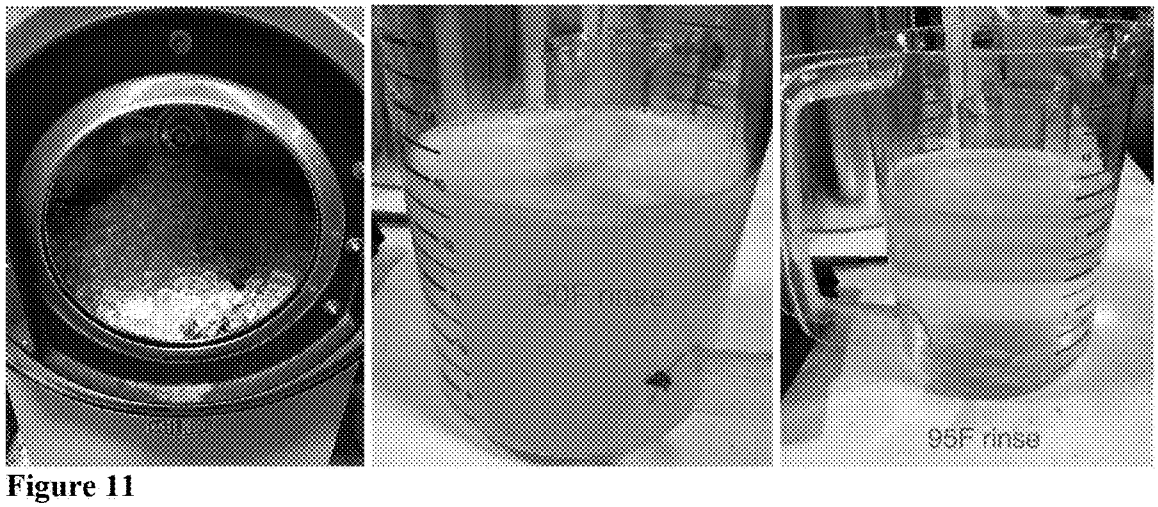
FIG. 11 shows the ice soak step and solution appearance for wash process 2 (Table 29).

| Wash Processes 1-3 | |
|---|---|
| Wash Process 1<br>170° F., 25 min, 8 fluid oz of C10PO8EO3 in 12-15 gal of water (no alkali)<br>Drain<br>Rinse 140° F., 3 min<br>Drain<br>Rinse 110° F., 3 min<br>Drain<br>IRONED | Results: 16% stain<br>FIG. 9 |
| Wash Process 2<br>Took the load from Wash Process 1 after ironing and counting 16% stain<br>Put in ice to get below CP of PO8EO3 which is about 60° F.<br>Process:<br>10 min ice soak no chemistry<br>Drain<br>3 min "cold water" fill raised temp to 95° F. because cold water in this plant is hotter<br>Got near 50° F. in washer<br>Suds reappeared at 50° F. where it hadn't shown on the previous rinse steps<br>ICE drain had oil color<br>95° F. drain did not have oil color | Results: 9% stain with this ice process alone on a previously 16% stain<br>FIG. 10 |
| Wash Process 3<br>(Combo of Wash Process 1 & 2 then iron)<br>170° F., 25 min, 8 fluid oz C10PO8EO3 in 12-15 gal of water (no alkali)<br>Drain<br>Rinse 140° F., 3 min<br>Drain<br>Rinse 110° F., 3 min<br>Drain<br>ICED 10 min, 50° F.<br>Drain<br>Cold water fill, 95° F.<br>Drain<br>IRONED | Results: 5% LIGHT stain<br>Color in cold water phenomena repeated itself |

TABLE 30

| Wash Processes 4-6 | |
|---|---|
| Wash Process 4<br>170° F., 25 min, 25 fluid oz of C10PO8EO6 in 12-15 gal of water (no alkali)<br>Drain<br>Rinse 140° F., 3 min<br>Drain<br>Rinse 110° F., 3 min<br>Drain<br>IRONED | Results: 0% Stain |
| Wash Process 5<br>140° F., 25 min, 25 fluid oz of C10PO8EO6 in 12-15 gal of water (no alkali)<br>Drain<br>Rinse 140° F., 3 min<br>Drain<br>Rinse 110° F., 3 min<br>Drain<br>IRONED | Results: 0% Stain |
| Wash Process 6<br>120° F., 25 min, 25 fluid oz of C10PO8EO6 in 12-15 gal of water (no alkali)<br>Drain<br>Rinse 120° F., 3 min<br>Drain<br>Rinse 110° F., 3 min<br>Drain<br>IRONED | Results: 3% Stain |

Table 30 demonstrates that the extended surfactant alone, with appropriate dosage, could work in a wide range of temperature (120 to 170° F.) to gain a near perfect result in field test (<3% reject rate).

The extended surfactant combined with block-co polymers or alkalinity will greatly improve the removal efficiency (less wash time and surfactant usage).

Overall use of caustic can be reduced with the use of these optimized extended nonionic surfactants.

Example 5

Enhanced Soil Release of Tough to Remove Cosmetic Soils:

Cosmetic soil removal from different textile substrates is a known challenge. In the following example we compared the removal of a representative lipstick soil from cotton and polyester textile substrate for two different cleaning systems: a) System A—Ecolab's most advanced in-line detergent system—Low Temperature Aquanomic detergent and b) System B—C10PO8EO6. For testing multiple loads of 28 lbs were loaded into a 35 lb Unimac Washer. Each load consisted of 6 representative swatches stained with lipstick. Both detergent system were added to an amount to result in a 200 ppm concentration in the suds phase.

Figure 12:
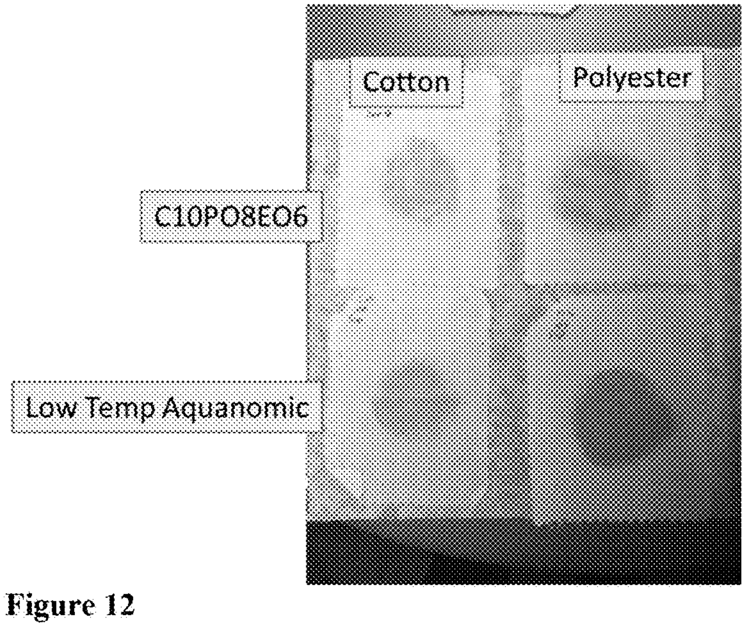
FIG. 12 shows the removal of lipstick as a function of the two detergent conditions and two substrates at the end of the wash phase. Significant improvement is seen for the lipstick swatches across both substrates for System B compared to System A.

FIG. 12 shows the removal of lipstick as a function of the two detergent conditions and two substrates at the end of the wash phase. Significant improvement is seen for the lipstick swatches across both substrates for System B compared to System A.

Example 6

Figure 13:
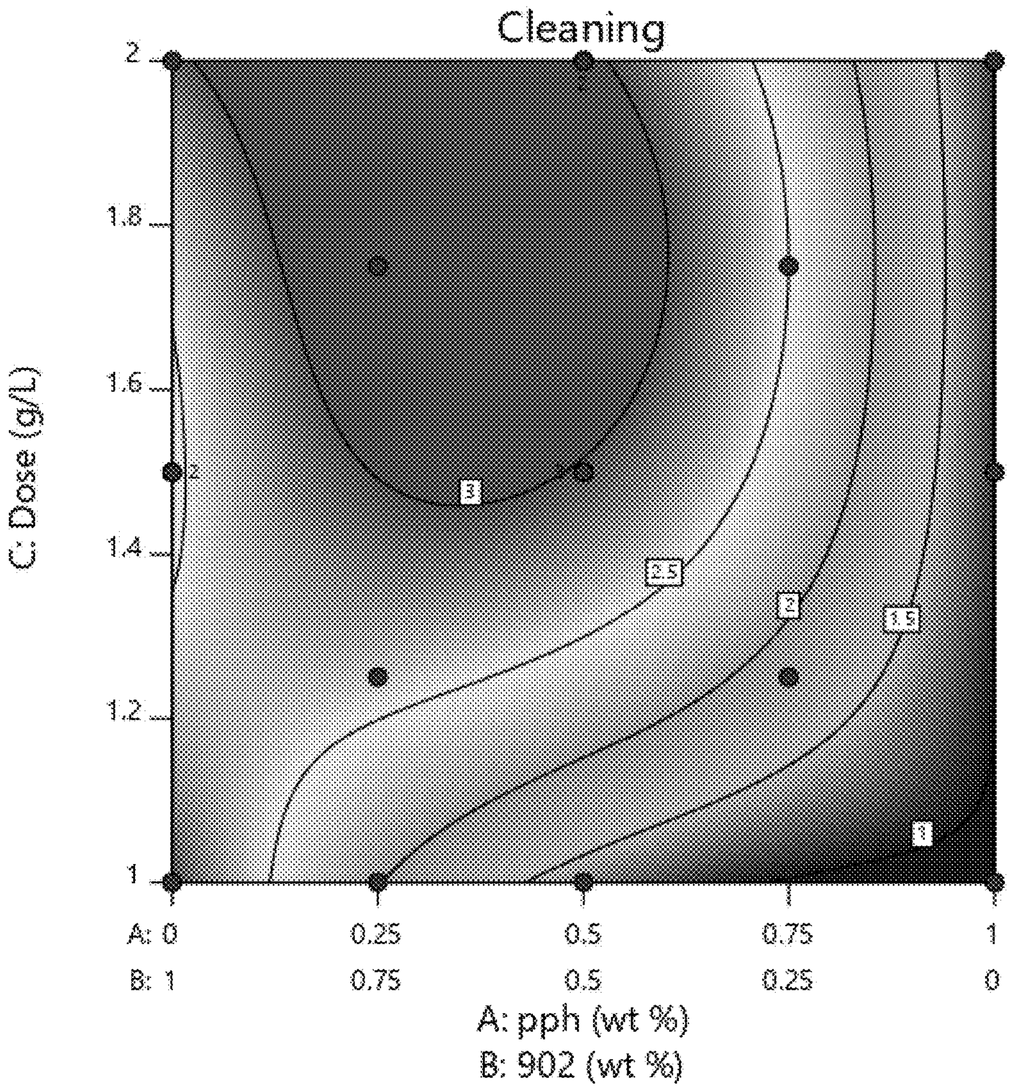
FIG. 13 shows the results of testing using a solvent (Dowanol PPH Glycol Ether) combined with C10PO8EO6. The solvent blended formula to Extended C10PO8EO6: Dowanol PPH to 3:1 demonstrated the best cleaning results.

Cleaning was tested using a solvent (Dowanol PPH Glycol Ether) combined with C10PO8EO6. Results are shown in FIG. 13. The solvent blended formula to Extended C10PO8EO6: Dowanol PPH to 3:1 demonstrated the best cleaning results.

What is claimed is:

1. A cleaning composition with a surfactant package comprising:

an extended chain nonionic surfactant comprising a $C_{10}$ or $C_{12}$-[PO]8-$[EO]_y$ guerbet alcohol, wherein y is the average degree of ethoxylation ranging from 3 to 10;

an additional surfactant having an EO/PO block copolymer, wherein the ratio of extended chain nonionic surfactant to EO/PO block copolymer is about 5:1, wherein no other extended chain nonionic surfactants are present, and wherein the composition is free of an alkalinity source.

2. The cleaning composition of claim 1 wherein said y is 3 and a micro emulsion is formed at a temperature of 80° to 90° F.

3. The cleaning composition of claim 1, wherein y is 6 and a micro emulsion is formed at a temperature of from about 120° to about 160° F.

4. The cleaning composition of claim 1, wherein y is 8 and said micro emulsion is formed at a temperature of from about 150° to about 185° F.

5. The cleaning composition of claim 1, wherein y is 10 and said micro emulsion is formed at a temperature of from about 165° to about 190° F.

6. The cleaning composition of claim 1 wherein the extended surfactant is based on linear alcohol.

7. The cleaning composition of claim 1, wherein the ratio of extended surfactant to additional surfactant is from about 1:5 to about 5:1.

8. The cleaning composition of claim 1 further comprising a solvent.

* * * * *